US010087738B2

(12) United States Patent
Zhang

(10) Patent No.: US 10,087,738 B2
(45) Date of Patent: Oct. 2, 2018

(54) ELECTROMAGNETIC CASING INSPECTION TOOL WITH AZIMUTHAL SENSITIVITY

(71) Applicant: Jun Zhang, Houston, TX (US)

(72) Inventor: Jun Zhang, Houston, TX (US)

(73) Assignee: Probe Technology Services, Inc., Fort Worth, TX (US)

( * ) Notice: Subject to any disclaimer, the term of this patent is extended or adjusted under 35 U.S.C. 154(b) by 218 days.

(21) Appl. No.: 15/188,372

(22) Filed: Jun. 21, 2016

(65) Prior Publication Data

US 2017/0362925 A1    Dec. 21, 2017

(51) Int. Cl.
E21B 47/00 (2012.01)
G01B 7/06 (2006.01)

(52) U.S. Cl.
CPC ............ E21B 47/00 (2013.01); G01B 7/06 (2013.01)

(58) Field of Classification Search
CPC .................................. E21B 47/00; G01B 7/06
USPC .................................................. 324/300–377
See application file for complete search history.

(56) References Cited

U.S. PATENT DOCUMENTS

| 2,573,799 | A | | 11/1951 | MacLean |
| 2,992,390 | A | | 7/1961 | Witte |
| 3,437,810 | A | | 4/1969 | Wood et al. |
| 3,940,689 | A | | 2/1976 | Johnson, Jr. |
| 4,292,588 | A | | 9/1981 | Smith |
| 4,292,589 | A | | 9/1981 | Bonner |
| 4,736,298 | A | * | 4/1988 | Easton ............... E21B 47/0905 702/6 |
| 4,899,112 | A | | 2/1990 | Clark et al. |
| 5,045,795 | A | | 9/1991 | Gianzero et al. |
| 5,331,331 | A | | 7/1994 | Wu |
| 5,339,036 | A | | 8/1994 | Clark et al. |
| 5,491,488 | A | | 2/1996 | Wu |
| 5,757,191 | A | | 5/1998 | Gianzero |
| 5,963,030 | A | * | 10/1999 | Stark ................ G01B 7/12 324/238 |
| 5,977,768 | A | * | 11/1999 | Sezginer ............ G01V 3/32 324/303 |
| 6,023,168 | A | | 2/2000 | Minerbo |
| 6,084,403 | A | | 7/2000 | Sinclair et al. |

(Continued)

FOREIGN PATENT DOCUMENTS

| EP | 0816838 | 1/1998 |
| WO | WO2016080968 | 5/2016 |

OTHER PUBLICATIONS

PCT/US2017/031692 International Search Report and Written Opinion dated Aug. 29, 2017.

Primary Examiner — Melissa Koval
Assistant Examiner — Rahul Maini
(74) Attorney, Agent, or Firm — Timothy M. Honeycutt

(57) ABSTRACT

Various downhole logging tools and methods of using and making the same are disclosed. In one aspect, a downhole logging tool for inspecting a well casing is provided that includes a housing adapted to be supported in the well casing by a support cable. A transmitter is positioned in the housing and operable to generate a magnetic field. Plural receivers are positioned in the housing in circumferentially-spaced apart relation and are operable to sense the magnetic field with azimuthal sensitivity. Electronic circuitry is operatively coupled to the receivers to determine a parameter of the sensed magnetic field and determine a characteristic of the well casing based on the parameter.

35 Claims, 14 Drawing Sheets

(56) References Cited

U.S. PATENT DOCUMENTS

| | | |
|---|---|---|
| 6,191,586 B1 | 2/2001 | Bittar |
| 6,359,438 B1 | 3/2002 | Bittar |
| 6,509,738 B1 | 1/2003 | Minerbo et al. |
| 6,690,170 B2 | 2/2004 | Homan et al. |
| 6,917,303 B2 | 7/2005 | Stuart-Bruges et al. |
| 6,933,726 B2 | 8/2005 | Chen et al. |
| 6,952,101 B2 | 10/2005 | Gupta |
| 7,327,145 B2 | 2/2008 | Haugland |
| 7,385,400 B2 | 6/2008 | Moore |
| 7,414,407 B2 | 8/2008 | Wang et al. |
| 7,436,183 B2 | 10/2008 | Clark |
| 7,436,184 B2 | 10/2008 | Moore |
| 7,742,008 B2 | 6/2010 | Wang et al. |
| 7,800,372 B2 | 9/2010 | Peter et al. |
| 7,960,969 B2 | 6/2011 | Mouget et al. |
| 2006/0119364 A1 | 6/2006 | Chen et al. |
| 2006/0202700 A1 | 9/2006 | Barolak et al. |
| 2008/0224707 A1 | 9/2008 | Wisler et al. |
| 2009/0188663 A1 | 7/2009 | Hall et al. |
| 2010/0206064 A1 | 8/2010 | Estes |
| 2013/0193953 A1 | 8/2013 | Yarbro et al. |
| 2015/0204648 A1 | 7/2015 | Nichols |
| 2016/0124107 A1 | 5/2016 | Wang |
| 2016/0168974 A1* | 6/2016 | Donderici ........... E21B 47/0002 324/238 |

* cited by examiner

ELECTROMAGNETIC CASING INSPECTION TOOL WITH AZIMUTHAL SENSITIVITY

BACKGROUND OF THE INVENTION

1. Field of the Invention

This invention relates generally to downhole tools, and more particularly to downhole logging tools capable of casing inspection.

2. Description of the Related Art

A well casing is a metal pipe inserted into a borehole to provide mechanical support for the borehole and to enable the driller to control the types of subsurface fluids allowed to enter the borehole and the locations for such entries. Well casings are normally constructed of ferromagnetic steels. As such, they are subject to corrosion, mechanical damage due to impacts from downhole tools and even warpage resulting from stresses imparted by shifting borehole formations. Accordingly, determining the condition of well casings through inspection is an important part of well drilling and management.

Casing inspection based on the remote-field eddy current principle has been widely used for casing inspection in oil and gas industry for decades. Conventional techniques use a transmitter to generate a magnetic field and a receiver to sense the magnetic field and then calculate the average casing thickness at a given depth based on the phase shift and amplitude attenuation of the magnetic field. In remote field eddy current techniques the receiver is placed in the remote-field zone, which is displaced vertically from the transmitter a distance greater than twice the casing inner diameter. The magnetic field created by a magnetic dipole source located inside the casing propagates in three zones: the direct coupling zone, the transition zone and the remote field zone. When the transmitter is fired, typically below 100 Hz, and generates direct field inside the casing, an eddy current is generated on the casing wall and forms a field against the primary field from the transmitter. Inside the casing and away from the transmitter, the direct field from the transmitter decays exponentially and rapidly due to eddy current loops. However, the magnetic field also penetrates through the casing wall and propagates outside the casing, where it encounters the formation and perhaps an annulus filled with cement. This component of the propagating magnetic field that penetrates through the casing wall and propagates outside the casing is the remote field. After penetrating the casing wall, the remote field attenuates due primarily to the media outside the casing, e.g., the cement and formation. So if the region outside the casing consists of low conductive media, the remote field decays much more slowly than the direct field. The field inside the casing is also affected by the remote field since the remote field always propagates back through the casing wall where it will undergo another decay. The final field inside the casing is thus made up of a superposition of the direct field and the remote field. Therefore, there is a direct coupling zone near the transmitter where the direct field dominates, the remote field zone where the field propagating back from outside the casing is much stronger and dominates, and the transition zone between the two where neither the direct field nor the remote field predominates, so neither can be ignored. Phase shift and amplitude attenuation measurements are made in the remote field zone. The measured relative signal phase shift is proportional to the casing wall thickness, casing conductivity and permeability. Once the other two parameters are pre-determined, the casing wall thickness can be accurately derived.

Manufacturers have produced various conventional casing inspection tool designs over the years. The Schlumberger Multi-Frequency Electromagnetic Thickness Tool (METT) utilized multiple coils and frequencies to solve the casing properties and the thickness at the same time in order to achieve better thickness accuracy. Other conventional remote-field eddy current tools include the Digital Magnelog (DMAG) from Baker Hughes, the Multi-Frequency Electromagnetic Thickness Gauge (METG) and Casing Inspection Tool (CIT) from Halliburton, Omni-Directional Thickness (ODT) from Hotwell, the Induction Collar Locator (ICL) from CBG Corp. and the Electromagnetic Inspection Tool (EMIT) from Probe Technology Services, Inc., the assignee of the present application. The measurements from all the technologies mentioned above are uni-directional and only indicate the circumferential average of the casing wall thickness.

There have been a few conventional designs that target an azimuthal casing thickness measurement. One variant is the Magnetic Thickness Tool (MTT) from GE Sondex. This design uses multiple sensors, mainly receivers, positioned on bow-springs or pads, which are usually extended out from the tool mandrel. The EM Pipe Scanner from Schlumberger, is another variant in this category. There are several issues associated with the bow-spring/pad mounted approach. First, the mechanical complexity of these designs introduces significant manufacturing and maintenance costs. Second, operational reliability may be problematic because of the moving parts.

Finally, one other conventional approach for azimuthal casing thickness measurement involves taking a measurement with a sensor, then physically rotating the sensor portion of the tool by some motorized mechanism. Again, cost and mechanical reliability remain issues with this technique.

The present invention is directed to overcoming or reducing the effects of one or more of the foregoing disadvantages.

SUMMARY OF THE INVENTION

In accordance with one aspect of the present invention, a downhole logging tool for inspecting a well casing is provided that includes a housing adapted to be supported in the well casing by a support cable. A transmitter is positioned in the housing and operable to generate a magnetic field. Plural receivers are positioned in the housing in circumferentially-spaced apart relation and are operable to sense the magnetic field with azimuthal sensitivity. Electronic circuitry is operatively coupled to the receivers to determine a parameter of the sensed magnetic field and determine a characteristic of the well casing based on the parameter.

In accordance with another aspect of the present invention, a downhole logging tool for inspecting a well casing is provided that includes a housing adapted to be supported in the well casing by a support cable. Plural transmitters are positioned in the housing in circumferentially-spaced apart relation and are operable to generate plural magnetic fields. A receiver is positioned in the housing and operable to sense the magnetic fields with azimuthal sensitivity. Electronic circuitry is operatively coupled to the receiver to determine a parameter of the sensed magnetic field and determine a characteristic of the well casing based on the parameter.

In accordance with another aspect of the present invention, a method of downhole logging a well that has a well casing is provided that includes suspending a housing in the well casing by a support cable. A transmitter positioned in the housing is energized to generate a magnetic field. The magnetic field is sensed with plural receivers positioned in the housing in circumferentially-spaced apart relation. The plural receivers sense the magnetic field with azimuthal sensitivity. A parameter of the sensed magnetic field and a characteristic of the well casing based on the parameter are determined.

In accordance with another aspect of the present invention, a method of downhole logging a well that has a well casing is provided that includes suspending a housing in the well casing by a support cable. Plural transmitter coils positioned in the housing in circumferentially-spaced apart relation are energized to generate plural magnetic fields. The magnetic fields are sensed with a receiver positioned in the housing. The receiver senses the magnetic fields with azimuthal sensitivity. A parameter of the sensed magnetic field and a characteristic of the well casing based on the parameter are determined.

In accordance with another aspect of the present invention, a transceiver for use in a downhole logging tool for inspecting a well casing is provided. The transceiver includes a transceiver antennae sleeve that has a hub and plural circumferentially-spaced radially extending fins. An electrically insulating receiver segment is positioned between each two adjacent fins and a first transceiver coil is wound on each of the transceiver segments and being operable to be energized to generate a magnetic field or to receive a generated magnetic field separately from the other transceiver coils to provide for azimuthally sensitive measurements of the downhole logging tool.

In accordance with another aspect of the present invention, a method manufacturing a downhole logging tool for inspecting a well casing is provided that includes fabricating a housing adapted to be supported in the well casing by a support cable. A first transceiver coil is positioned in the housing. The first transceiver coil is operable to generate and/or sense a magnetic field. Plural second transceiver coils are positioned in the housing in circumferentially-spaced apart relation to generate and/or sense the magnetic field with azimuthal sensitivity.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
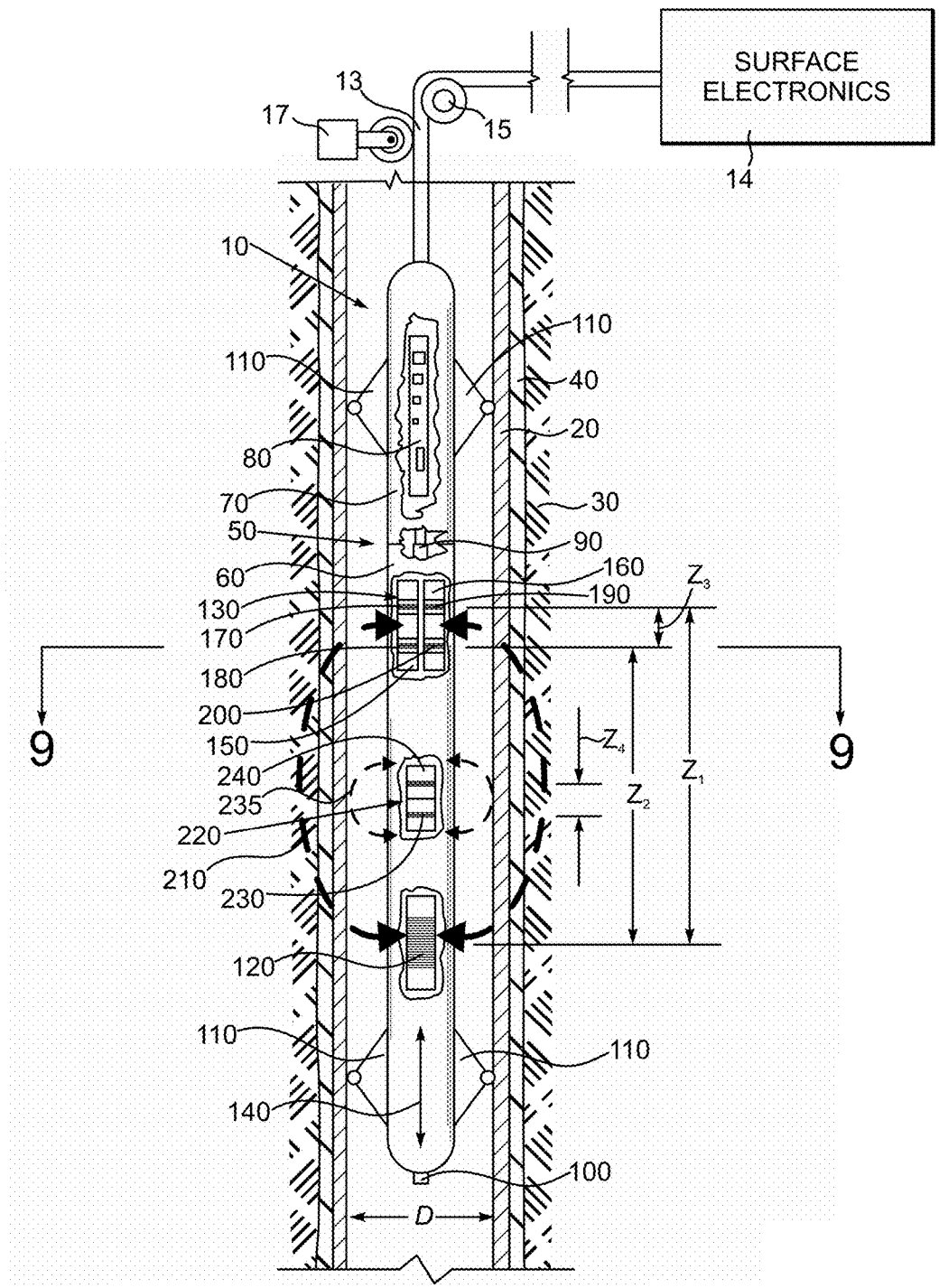
FIG. 1 is a schematic view of an exemplary embodiment of a downhole logging tool that may used for casing inspection and other uses.

In the drawings described below, reference numerals are generally repeated where identical elements appear in more than one figure. Turning now to the drawings, and in particular to FIG. 1, therein is shown a schematic view of an exemplary embodiment of a downhole logging tool 10 that may used for casing inspection and other uses. The downhole logging tool 10 is operatively coupled to a support cable 13, which may be a wireline or slickline. If configured as a wireline, the support cable 13 provides electrical connectivity and power between the downhole logging tool 10 and surface electronics 14, as well as mechanical suspension for the downhole logging tool 10. The support cable 13 is typically fed from a winch (not shown), passed around a pulley 15 and engages an odometer 17 or other type of distance measuring device. The odometer 17 tracks the penetration depth of the downhole logging tool 10. In the event that the support cable 13 is a slick line, then an optional power and data storage module or sonde (not shown) may be attached to the downhole logging tool 10. The surface electronics 14 may include power supply, data processing, telemetry, storage and virtually any other functions suitable for cable logging.

The downhole logging tool 10 is positioned inside a well casing 20 that is separated laterally from a surrounding formation 30 by way of a cemented annulus 40. The downhole logging tool 10 includes a sonde 50, which may include a sensor housing 60 and an electronics housing 70. The sensor housing 60 may enclose a variety of different types of sensors to be described in more detail below. The electronics housing 70 may enclose signal processing, power supply and other types of electronic circuitry. A portion of the electronics housing 70 is shown cut away to reveal a schematic depiction of the signal processing and power electronics 80. Optionally, the sensor housing 60 and the electronics housing 70 may be combined into a single housing if desired. The sensor housing 60 or more particularly the sensors disposed therein may be electronically and electrically connected to the electronics housing 70 by way of a suitable connector or connectors 90, which is shown in a cutaway portion at the junction of the sensor housing 60 and the electronics housing 70. The connector 90 may be any of a great variety of different types of downhole tool interface connectors, such as, for example, a 32-pin thread engagement connector or other. The electronics housing 70 may be connected to the sensor housing by way of a threaded coupling or other type of joint. The sensor housing 60 may connect to another sonde or components at its other end by way of another connector 100, which may be like the connector 90 or another type such as a single-pin wet stab connector or other. The sonde 50 may be centralized within the casing 20 by way of plural centralizers, four of which are visible and labeled 110. There may be centralizers 110 at each end of the sonde 50 and may number three or more and be of any configuration.

The sensor housing 60 encloses a variety of sensors. For example, the sensor housing 60 may enclose a transmitter 120 and a receiver array 130 that are configured to provide an azimuthally sensitive remote field eddy current casing inspection measurement. The transmitter 120 may be a multi-turn solenoid coil that generates a magnetic dipole that is generally aligned with the long axis 140 of the sonde 50. The receiver array 130 may consist of plural receiver segments, two of which are visible and labeled 150 and 160, respectively. As described in more detail below, this illustrative embodiment includes four circumferentially-spaced receiver segments, and thus there are two segments that are not visible in FIG. 1 in addition to the depicted receiver segments 150 and 160. The receiver segment 150 includes a main receiver 170 and a differential receiver 180. The receiver segment 160 similarly includes a main receiver 190 and a differential receiver 200. To ensure that the electromagnetic field 210 generated by the transmitter 120 couples to the main receivers 170 and 190 and the differential receivers 180 and 200 with a predominant remote field component, it is desirable to position the main receivers 170 and 190 a distance $Z_1$ from the transmitter 120 where $Z_1$ is approximately two times or more the diameter D of the casing 20. The differential receivers 180 and 200 are spaced from the transmitter 120 a distance $Z_2$, where $Z_2 < Z_1$, which produces a spacing $Z_3 = Z_1 - Z_2$ between the differential receivers 180 and 200 and the main receivers 170 and 190. The value of $Z_3$ may be about 1.0 to 3.0 inches and in an exemplary embodiment approximately 1.25 inches. The values of $Z_1$, $Z_2$ and $Z_3$ will be predetermined depending on the tool size appropriate for the casing diameter D, the casing average thickness and the casing material properties.

A caliper arrangement 220 may be positioned in the sensor housing 60 to provide a measurement of the diameter D and other properties, such as the conductivity, of the casing 20. In this illustrative embodiment, the caliper assembly 220 may consist of a transmitter coil 230 that is operable to generate a magnetic field 235 as a magnetic dipole generally aligned with the tool axis 140. The transmitter coil 230 may be a multi-turn coil or other type of transmitter. The receiver coil 240 may be configured like the transmitter coil 230 and is operable to receive the electromagnetic field and generate an induced voltage that may be examined for phase and/or amplitude difference relative to the current driving the transmitter 230. The receiver coil 240 and the transmitter coil 230 may be spaced along the tool axis 140 by some spacing $Z_4$, which is selected to ensure that the received electromagnetic field 235 provides sensitivity to a caliper measurement.

The sensor housing 60 and the electronics housing 70 are advantageously constructed of non-ferromagnetic materials in order to minimize interference with transmitted and received electromagnetic waves. Examples include various types of stainless steel, fiberglass, carbon composite or other synthetic materials or the like. The sensor housing 60 may be constructed of one or more sleeves of various materials connected end to end. For example, the portion of the sensor housing 60 that covers the caliper sensor arrangement 220 may be constructed of fiberglass for enhanced signal propagation while other portions may be constructed of other of the materials described above.

Figure 2:
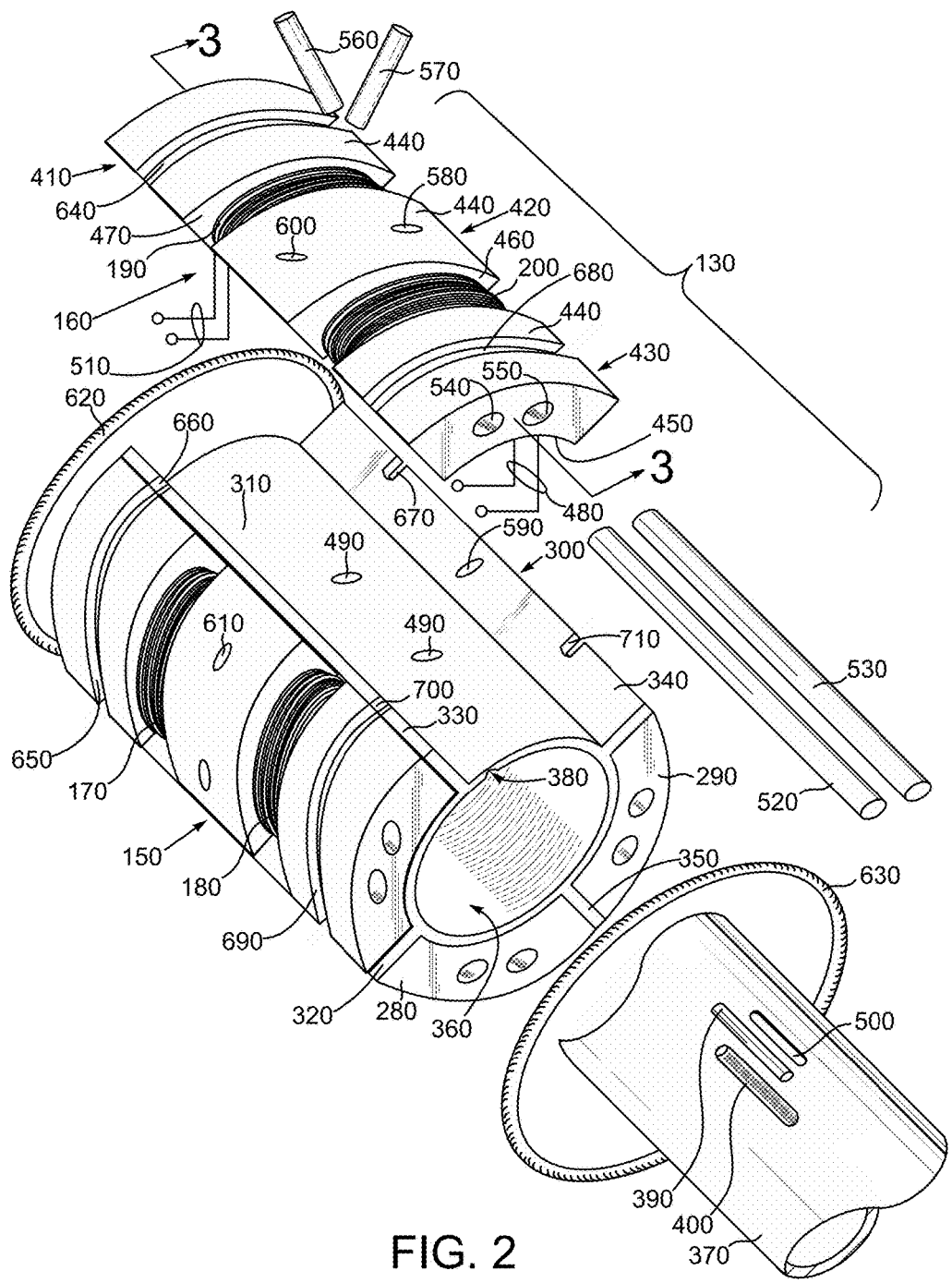
FIG. 2 is a pictorial view of an exemplary embodiment of a receiver and/or transmitter array.

Additional details of the receiver array 130 may be understood by referring now to FIG. 2, which is a pictorial view of the receiver array 130 with some components thereof exploded. The receiver segments 150 and 160, and two additional circumferentially-spaced apart receiver segments 280 and 290 (which were not visible in FIG. 1) may be positioned on an antenna sleeve 300. The antenna sleeve 300 includes a central, tubular hub 310 and four circumferentially-spaced, radially-projecting fins 320, 330, 340 and 350. The fins 320, 330, 340 and 350 provide a convenient way of circumferentially spacing and physically isolating the receiver segments 150, 160, 280 and 290. For example, the receiver segment 150 is positioned on the hub 310 and sandwiched between the fins 320 and 330. Similarly, the receiver segment 160 is positioned on the hub 310 and sandwiched between the fins 330 and 340, and so for the receiver segment 280 and the fins 320 and 350 and the receiver segment 290 and the fins 340 and 350. Of course, the number of receiver segments 150, 160, 280 and 290 may be other than four. The greater the number of segments, the greater the azimuthal sensitivity. The hub 310 includes a longitudinal bore 360. The antenna sleeve 300, by way of the bore 360, may be slipped over a support mandrel 370, only a portion of which is depicted. The support mandrel 370 may extend through substantial portions of the sensor housing 60 depicted in FIG. 1 in order to provide internal support for various components in addition to the receiver array 130, such as the transmitter 120, the caliper array 220 and others. To prevent the antenna sleeve 300 from rotating relative to the support mandrel 370, the hub 310 may be provided with a longitudinal slot 380 that is designed to slip past, but otherwise seat on an anti-rotation rod 390. The anti-rotation rod 390 may be seated in a longitudinal slot 400 formed in the support mandrel 370. The antenna sleeve 300 is advantageously composed of highly electrically conductive materials, such as aluminum, gold, copper, silver or the like, but may also be constructed of other types of materials, such PEEK, other plastics, fiberglass, or other materials. If constructed of highly conductive materials, the antenna sleeve 300 has the potential to more narrowly focus the reception of electromagnetic energy for the receivers (e.g., the main receiver 190 and the differential receiver 200) of one receiver segment 160 relative to the receivers of the other receiver segments 150, 280 and 290. The support mandrel 370 may be composed of the same types of materials used for the sonde 50 shown in FIG. 1. However, the support mandrel 370 could be manufactured from ferromagnetic materials to function like the antenna sleeve 300 in focusing the azimuthal sensitivity of the receivers (e.g., 190, 200 etc.). The metallic components of the downhole logging tool 10 and any disclosed alternatives may be fabricated by forging, casting, machining, welding, combinations of these or others. The polymeric or otherwise synthetic components may be fabricated by molding, machining, welding combinations of these or others.

The following description of the receiver segment 160 will be illustrative of the other receiver segments 150, 280 and 290. The receiver segment 160 may include an upper section 410, a central section 420 and a lower section 430, where the terms "upper" and "lower" are somewhat arbitrary. The upper section 410, the middle section 420 and the lower section 430 each include an outer arcuate surface 440 and an inner arcuate surface 450. Note that the inner arcuate surfaces of the central section 420 and the upper section 410 are not visible. The main receiver 190 may be a single or multi-turn wire coil, or another type of magnetic field sensor or magnetometer, such as a flux gate magnetometer, a Hall Effect sensor, a giant magneto resistive sensor (GMR) or other. In this illustrative embodiment, the main receiver 190 may be a multi-turn wire coil wound around a necked down portion 460 of the receiver segment 160 positioned between the central portion 420 and the lower portion 430, and the differential receiver 200 may be a multi-turn wire coil similarly wound around a necked down portion 470 between the upper section 410 and the central portion 420. The composition, number of turns and gauge of the wire may varied according to tool size, casing properties and other factors. In an exemplary embodiment the main receiver 190 consists of approximately 2,000 turns of insulated 40 gauge magnet wire. The differential receiver coil 200 may be configured like the main receiver coil 190. Both the main receiver 190 and the differential receiver coil 200 may be covered by an insulating tape or other insulating film (not shown) but visible in a subsequent figure. The leads 480 of the main receiver 190 may be routed from the receiver segment 160 in a variety of ways. For example, the leads 480 may be inserted through a suitable opening 490 in the hub 310, and thereafter inserted through another suitable opening 500 in the support mandrel 370 and thereafter routed longitudinally through the support mandrel 370. In another embodiment, the leads 480 may be routed longitudinally outside of the support mandrel 370. The same is true for the leads 510 of the differential receiver coil 200. Note that the main receiver 170 and the differential receiver 180 for receiver segment 150 are visible.

The receiver segment 160 is designed to provide and electrically insulating support for the main receiver 190 and the differential receiver 200, and thus is advantageously fabricated from a variety of electrically insulating materials. Examples include PEEK, or other materials. To enhance the sensitivity of the main receiver 190 and the differential receiver 200, rods 520 and 530 composed of ferrite or other high permeability materials, may be inserted in respective longitudinal bores 540 and 550 in the receiver segment 160. The number size and spacing of the rods 520 may be other than two and other than purely round as desired. The receiver segment 160 may be held in place on the receiver sleeve 300 in a variety of ways. Adhesives, mechanical fasteners, or otherwise may be used. In this illustrative embodiment, the receiver segment 160 may be secured to the sleeve 300 by way of pins 560 and 570. The pin 560 may be inserted into a bore 580 in the central section 420 of the receiver segment 160, then passed through a bore 590 in the fin 340 and ultimately into another bore like the bore 580 (not visible) in the receiver segment 290. The pin 570 may be similarly inserted into a bore 600 and thereafter through a bore (not visible) in the fin 330 and ultimately into a bore 610 in the receiver segment 150. The pins 560 and 570 are sized to provide friction fits. O-rings 620 and 630 may be provided on the exterior of the receiver array 130 to provide vibration isolation from the sensor housing 60 (see FIG. 1). For example, the O-ring 620 may be positioned in an arcuate slot 640 in the upper section 440 of the receiver segment 160 as well as a corresponding arcuate slot 650 in the segment 150 and corresponding slots in the segments 280 and 290 that are not visible. The O-ring 620 may seat in slots 660 and 670 of the fins 330 and 340, respectively. The O-ring 630 may similarly be seated in an arcuate slot 680 of the lower section 430 of the receiver segment 160 and arcuate slot 690 of the segment 150 as well as corresponding slots (not visible) in the receiver segments 280 and 290 and in the fins 330 and 340 by way of respective slots 700 and 710.

Figure 3:
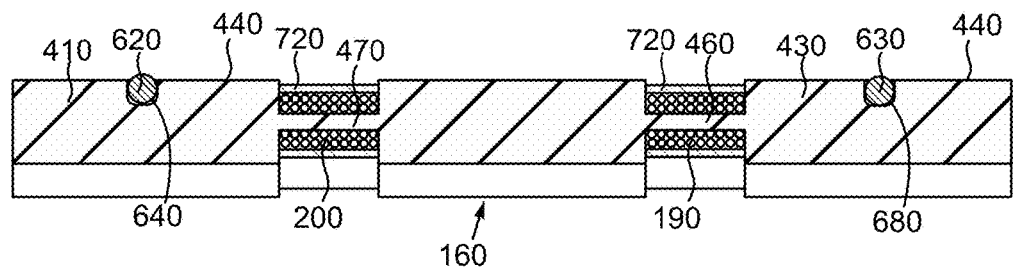
FIG. 3 is a sectional view of a portion of FIG. 2 taken at section 3-3.

Additional details of the receiver segment 160 may be understood by referring now to FIG. 3, which is a sectional view of FIG. 2 taken at section 3-3. Note that because of the position of section 3-3, only the receiver segment 160 is shown in section and visible. Note also that because of the location of section 3-3, the pins 560 and 570 are not visible. As noted above in conjunction with FIG. 2, the multiple turns of the main receiver 190 are wound around the neck down portion 460 and may be covered by an insulating tape or other type of film 720. The multiple turns of the differential receiver 200 are similarly positioned on the other neck down portion 470 and may be covered with an insulating tape 720 or covering. The necked down portions 460 and 470 are sized so that the coils 190 and 200 do not project radially beyond the arcuate surfaces 440 of the upper portion 410 and the lower portion 430 of the receiver segment 160. Furthermore, the O-rings 620 and 630 and their corresponding slots 640 and 680 are sized such that the O-rings 620 and 630 do project beyond the arcuate surfaces 440 and engage the inner surface of the sensor housing 60 (see FIG. 1) to provide vibration isolation.

Figure 4:
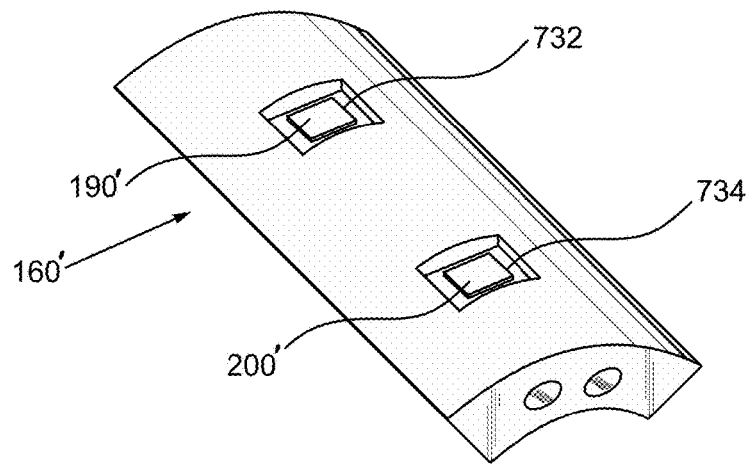
FIG. 4 is a pictorial view of an alternate exemplary receiver segment.

As noted above, the main receiver and differential receiver of a receiver segment, such as the main receiver 190 and differential receiver 200 of the receiver segment 160, may be other than a solenoid coil. In this regard, FIG. 4 is a pictorial view of an alternate exemplary receiver segment 160'. The following discussion of the receiver segment 160' will be illustrative of other similar receiver segments that may be circumferentially spaced apart on an array. The receiver segment 160' may be substantially like the receiver segment 160 discussed above with a few exceptions. Here, the receiver segment 160' may include an alternate exemplary main receiver 190' and an alternate exemplary differential receiver 200'. The main receiver 190' and the differential receiver 200' may be a flux gate magnetometer, a Hall Effect sensor, a GMR sensor or other type of magnetic sensor or magnetometer. If desired, suitable spaces 732 and 734 (in lieu of or in addition to the necked down portions depicted in FIG. 2) may be formed in the receiver segment using well-known techniques 160 to hold the main receiver 190' and the differential receiver 200', respectively. O-rings (not shown) like the O-rings 620 and 630 may be used with the receiver segment 160'.

Figure 5:
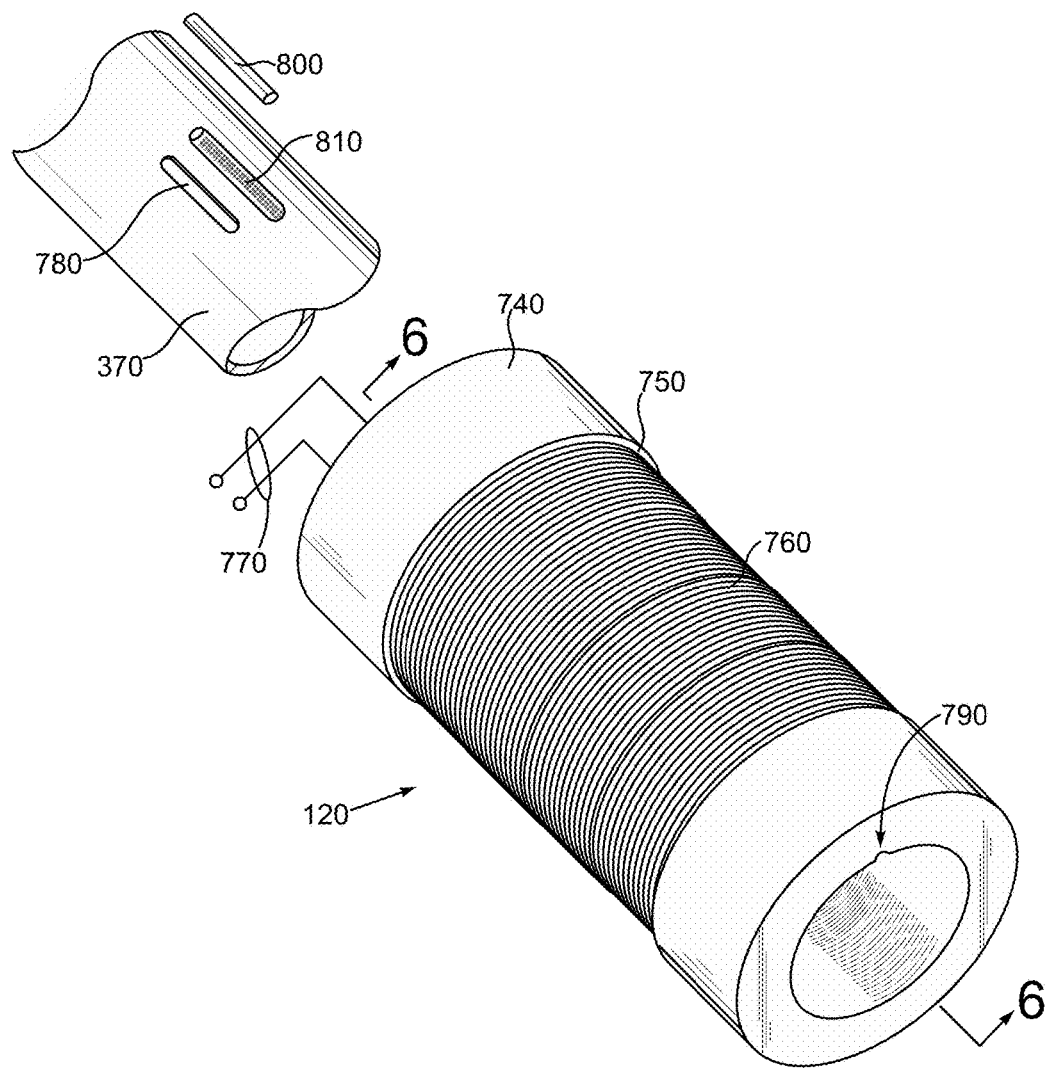
FIG. 5 is a pictorial view of an exemplary embodiment of a transmitter and/or receiver.

Additional details of the transmitter 120 depicted in FIG. 1 may be understood by referring now also to FIG. 5. FIG. 5 is a pictorial view of the transmitter 120 exploded from the support mandrel 370, which as noted above, may also be used to provide structural support for the receiver array 130 depicted in FIGS. 1 and 2. The transmitter 120 may include a cylindrical support body 740 that includes a central necked down portion 750 around which the multiple turns of the transmitter coil 760 are wound. The support body 740 may be constructed of the same types of materials and using the same techniques discussed above in conjunction with the receiver segment 160 shown FIG. 2. The composition, number of turns and gauge of the wire used for the transmitter coil 760 may be varied according to tool size, casing properties and other factors. In an exemplary embodiment, the transmitter coil 760 may include approximately 20,000 turns of insulated 32 gauge magnet wire. Like the main and differential receiver coils 190 and 200 described above, the transmitter coil 760 may be wrapped or otherwise covered with an insulating coating that is not visible in FIG. 5. The leads 770 of the transmitter coil 760 may be routed away from the transmitter 120 in a variety of ways. For example, the leads 770 may be routed through the support mandrel 370 by way of a suitable opening 780 or may be routed external to the support mandrel 370 as desired. To prevent the transmitter support body 740 from rotating relative to the support mandrel 370, the transmitter support body 740 may be provided with a longitudinal slot 790 that slides over an anti-rotation rod 800 that may be positioned in a longitudinal slot 810 in the support mandrel 370.

Figure 6:
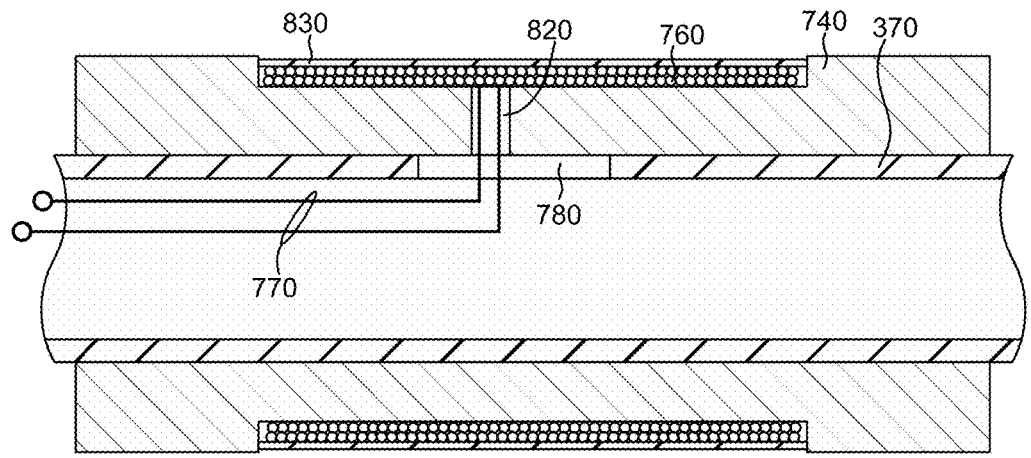
FIG. 6 is a sectional view of FIG. 5 taken at section 6-6.

Still further details of the transmitter 120 may be understood by referring now also to FIG. 6, which is a sectional view of FIG. 5 taken at section 6-6. Section 6-6 is positioned such that the slot or opening 780 is visible but the slot 810 and the antirotation rod 800 are not visible. The leads 770 of the multi-turn transmitter coil 760 may be routed down through the transmitter support body 740 by way of a suitable opening 820 and thereafter through the slot 780 in the support mandrel 370. Here, a protective insulating tape or other coating 830 may be wrapped around or otherwise applied to the exterior of the transmitter coil 760 for protective purposes.

Figure 7:
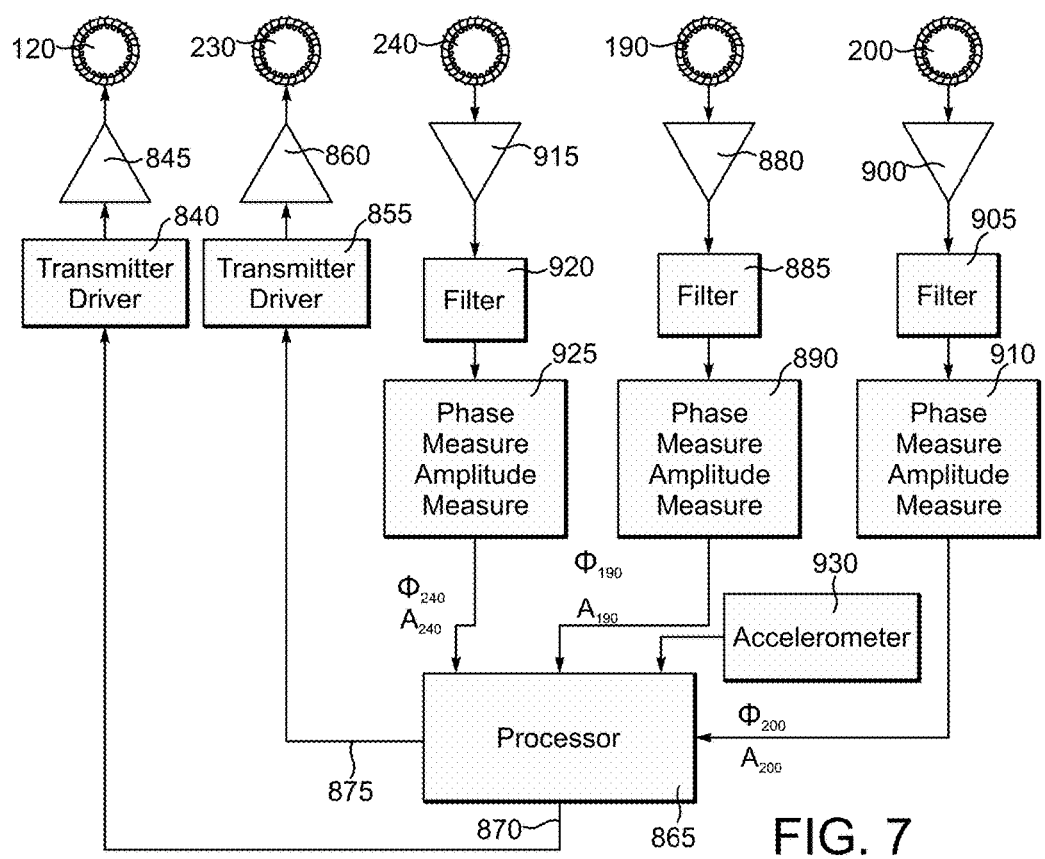
FIG. 7 is a block diagram depicting an exemplary embodiment of transmitter driving and receiver processing circuitry.

Exemplary electronics for driving the transmitter 120 and the caliper transmitter 230, and processing signals received by the main receiver 190, the differential receiver 200 and the caliper receiver 240, respectively, may be understood by referring now to FIG. 1 and to the block diagram depicted in FIG. 7. Here, the transmitter 120, the caliper transmitter 230, the main receiver 190, the differential receiver 200 and the caliper receiver 240 are schematically represented as wire coils for simplicity of illustration. Referring specifically to FIG. 7, the transmitter 120 is energized by way of a transmitter driver 840. The transmitter driver 840 delivers an oscillating signal to an amplifier 845. The output of the amplifier 845 is tied to the transmitter 120. The output current of the transmitter driver 840 may take on a variety of waveforms, such as sine wave, square wave or other and may be a continuous waveform or pulsed. For example, in an embodiment, the oscillating output may be generated for a few tens of milliseconds every 1 to 3 seconds. The remote field eddy current measurement may be performed with the transmitter 120 driven between about 10 to 120 Hz. The amplifier 845 may be advantageously configured to operate as an automated gain control (AGC) amplifier to accommodate variations in the transmitter current delivered to the transmitter 120. The skilled artisan will appreciate that the transmitter current delivered to the transmitter 120 is a function of the conditions of the casing being inspected and thus the AGC functionality can accommodate these fluctuations in transmitter current. The transmitter 230 similarly receives an oscillating signal from a transmitter driver 855 by way of an amplifier 860. Both the transmitter drivers 840 and 855 may be tied to and otherwise controlled by a processor 865, which may be a microprocessor, an application specific integrated circuit or other type of integrated circuit. The processor 865 and the electronics circuitry may be positioned in the electronics housing 70 (see FIG. 1) or even in the surface electronics 14 if desired if the support cable 13 is a wireline. Power may be supplied to the transmitter drivers 840 and 855 by a power supply (not shown) in the tool 10 or via the support cable 13 if configured as a wireline. The processor 865 can set the frequency and current for the transmitter drivers 840 and 855. The peak transmitter current may be about 5 to 30 milliamps and, in a preferred embodiment, about 15 milliamps.

The main receiver 190 receives the remote field magnetic field and outputs an induced alternating current signal to an amplifier 880. The amplifier 880 outputs an amplified signal to a filter 885, which may be a band pass filter or low pass filter as desired. The output of the filter 885 is delivered to a phase measure and amplitude measure logic block 890. The phase measure and amplitude measure logic block 890 receives the output of the filter 885 and determines the phase difference or phase change $\Phi_{190}$ sensed by the main receiver 190 relative to the transmitter driving current delivered to the transmitter 120 as well as the amplitude attenuation $A_{190}$ of the received signal. The subscripts here denote quantities associated with a particular receiver. The phase measure and amplitude measure block 890 then delivers the calculated phase change $\Phi_{190}$ and amplitude attenuation $A_{190}$ to the processor 865. The processor 865 is operable to take the phase change $\Phi_{190}$ and amplitude attenuation $A_{190}$ and calculate the thickness of the casing 20 proximate the main receiver 190. Of course, the thickness calculation could be performed by the phase measure and amplitude measure block 890. Indeed, the blocks depicted in FIG. 6 could be integrated in one or several integrated circuits or devices. The output of the transmitter 200 is similarly delivered to an amplifier 900, then passed through a filter 905 and ultimately to a phase measure and amplitude measure logic 910. The amplifier 900, the filter 905 and the phase measure/amplitude measure 910 may be configured and function as described above in conjunction with the amplifier 880, filter 885 and phase measure/amplitude measure block 890. The phase measure/amplitude measure block 910 delivers phase change $\Phi_{200}$ and amplitude attenuation $A_{200}$ to the processor 865 where the differential thickness of the casing 20 proximate the differential receiver 200 may be computed.

The caliper receiver coil 240 similarly outputs to an amplifier 915 and in turn to a filter 920 and a phase measure and amplitude measure block 925, which may function like the amplifier 880, filter 885 and phase measure/amplitude measure 890. However, the characteristics of the amplifier 915, the filter 920 and the phase measure/amplitude measure block 925 will be tailored to the characteristics of the electromagnetic signal propagation and reception associated with the caliper transmitter 230 and the caliper receiver 240. The phase measure/amplitude measure block 925 outputs the phase change $\Phi_{240}$ and amplitude attenuation $A_{240}$ to the processor 865 where the caliper of the casing 20 proximate the caliper receiver 240 may be computed. The caliper measurement may be correlated with the calculated casing thickness to generate a 3D azimuthal thickness image. Optionally, electro-mechanical caliper measurements using, for example, extendable arms or other mechanisms (not shown) may be used in the same way to produce an image. However, since the caliper receiver 240 is making instantaneous measurements at a different depth than the main receiver 190 due the vertical spacing between the two receivers 190 and 240, the caliper measurements should be time or depth stamped and later time or depth correlated to the measurements of the receiver 190. It should be understood that the foregoing circuitry is extended to all the receivers of the other receiver segments 150, 280 and 290 (see FIG. 2). Various levels of integration are envisioned. For example, in lieu of dedicated channels (i.e., dedicated amplifiers, filters and phase measure/amplitude measure blocks for each transmitter and receiver) single driving and reception circuitry may tie to multiple antennae by way one or more multiplexers. In addition, the filtering, driving and other signal processing may be integrated into one, a few or many integrated circuits and devices.

Still referring to FIG. 7, an accelerometer 930 may be included in the tool 10 (see FIG. 1) to provide a measure of the relative azimuth of the tool 10 while in the well casing 20. The accelerometer 930 may be a multi-axis accelerometer of solid state design or otherwise and may provide an output to the processor 865 or other circuit and may be integrated into the processor 865 if desired. It may be difficult or impossible to measure the true azimuth of the tool 10 in the casing 20 using traditional earth magnetic field sensing due to the field distortion caused by the casing 20. Therefore, the true azimuth of the tool 10 while in the well casing 20 may be determined using other references, such as the starting azimuth of the tool 10 at the surface, or by way of a gyroscopic sensor located in the tool 10 or in another sonde and that measurement used with the casing property measurements disclosed herein to provide azimuthal images of the properties of the casing 20.

Figure 8:
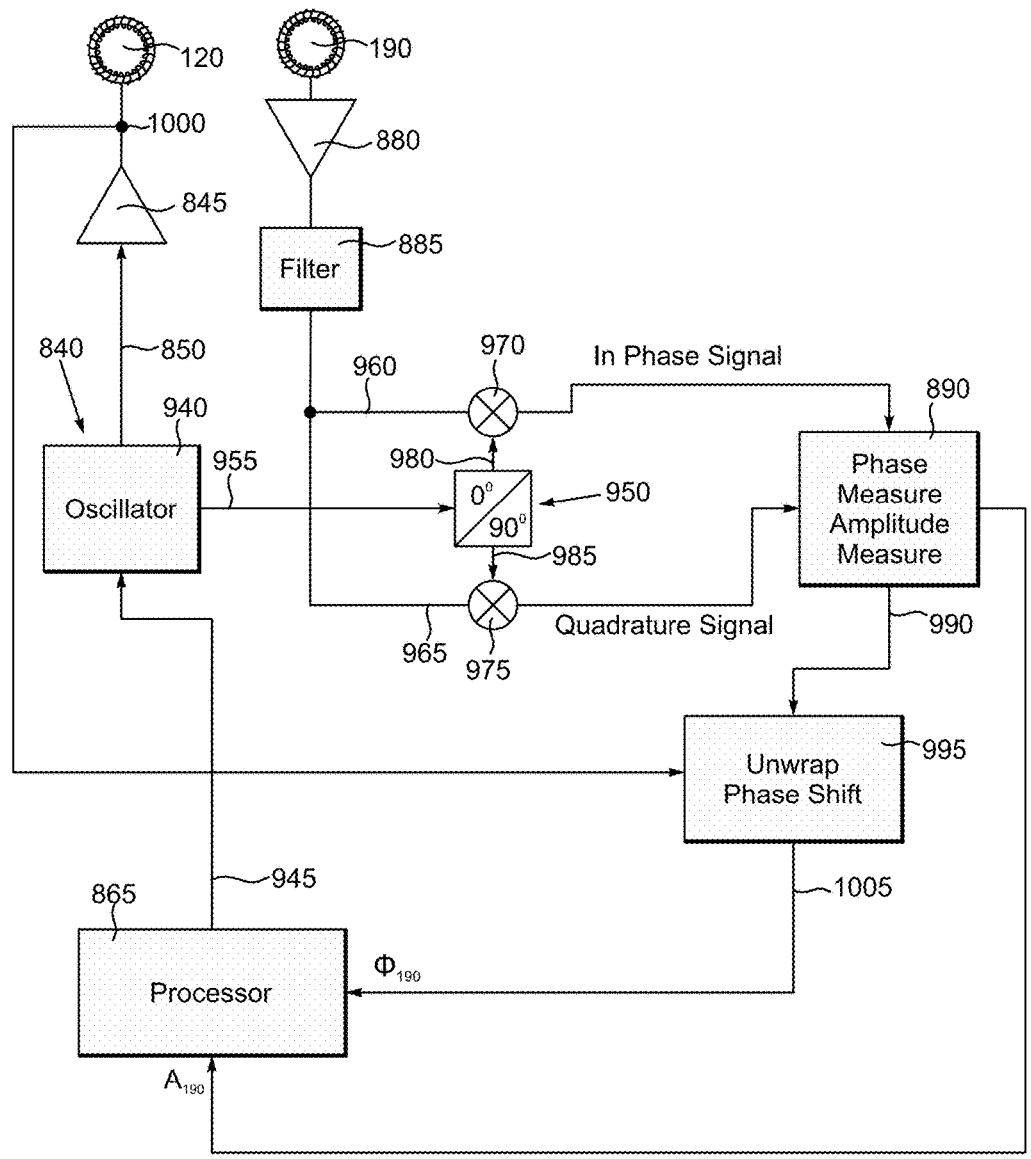
FIG. 8 is a schematic block diagram of exemplary transmitter driving and receiver processing circuitry.

Additional details of an exemplary embodiment of the transmitter driver and phase measure/amplitude measure circuitry associated with, for example, the transmitter 120 and the receiver 190 may be understood by referring now to FIG. 8, which is a block diagram/schematic. Note that the following description will be applicable to the other receivers, e.g., the differential receiver 200 and the others. The transmitter driver 840 includes an oscillator 940 which is operable to deliver an oscillating signal to the amplifier 845 and ultimately to the transmitter 120. The oscillator 940 may be a voltage controlled oscillator, a phase lock loop or other and may be a discrete component as depicted or integrated into the processor 865 or other integrated circuit as desired. The frequency of the output of the oscillator 940 may be dictated by a control signal input 945 from the processor 865. The oscillator 940 additionally provides the same driving signal to a phase shifter 950 at output 955. The function of the phase shifter 950 will be described in more detail below. Electromagnetic signals received by the main receiver 190 are delivered to the amplifier 880 and thereafter to the filter 885. The output of the filter 885 is delivered simultaneously as inputs 960 and 965 to mixers 970 and 975, respectively. The mixer 970 receives an additional input 980 from the phase shifter 950, which is in fact not phase shifted such that the mixer 970 outputs the filtered signal 885 as an in phase signal to the phase measure/amplitude measure block 890. The other mixer 975 receives a 90° phase shifted input 985 from the phase shifter 950 and mixes that 90° phase shifted signal with the output of the filter 885 to deliver a quadrature signal to the phase measure/amplitude measure block 890. In this way, the phase measure and amplitude measure block 890 is operable to use the in phase signal and the quadrature signal to compute phase shift $\Phi_{190}$ and amplitude attenuation $A_{190}$. There may be situations where the phase shift $\Phi_{190}$ of the filtered signal from the filter 885 is greater than 180° but the measured phase shift is not, which can produce an ambiguous result for casing thickness. To account for this situation, the phase measure/amplitude measure block 890 delivers a raw phase signal at output 990 to an unwrapped phase shift block 995. The unwrapped phase shift block 995 utilizes the transmitter current tapped at the node 1000 at the output of the amplifier 845 and corrects the phase of the input 990 by adding, for example, 360°, to the measured phase value in order to correct for greater than 180° phase shift values. The unwrapped phase shift block 995 ultimately delivers the phase shift signal $\Phi_{190}$ to the processor 865. In addition, the phase measure amplitude measure block 890 delivers the amplitude signal to the processor 865. As noted above, the processor 865 may use the phase and amplitude values to compute casing and thickness and other quantities.

Figure 9:
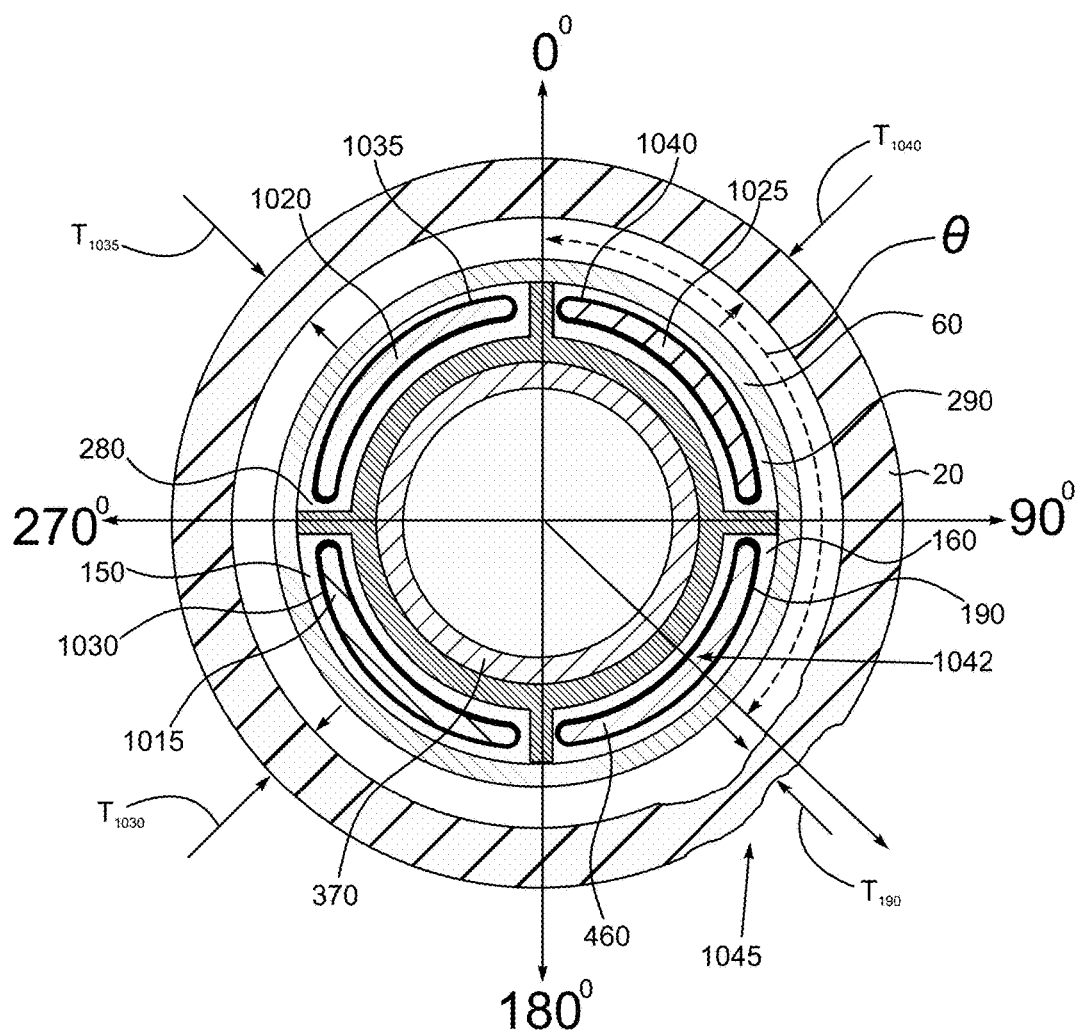
FIG. 9 is a simplified sectional view of FIG. 1 taken at section 8-8.
Figure 10:
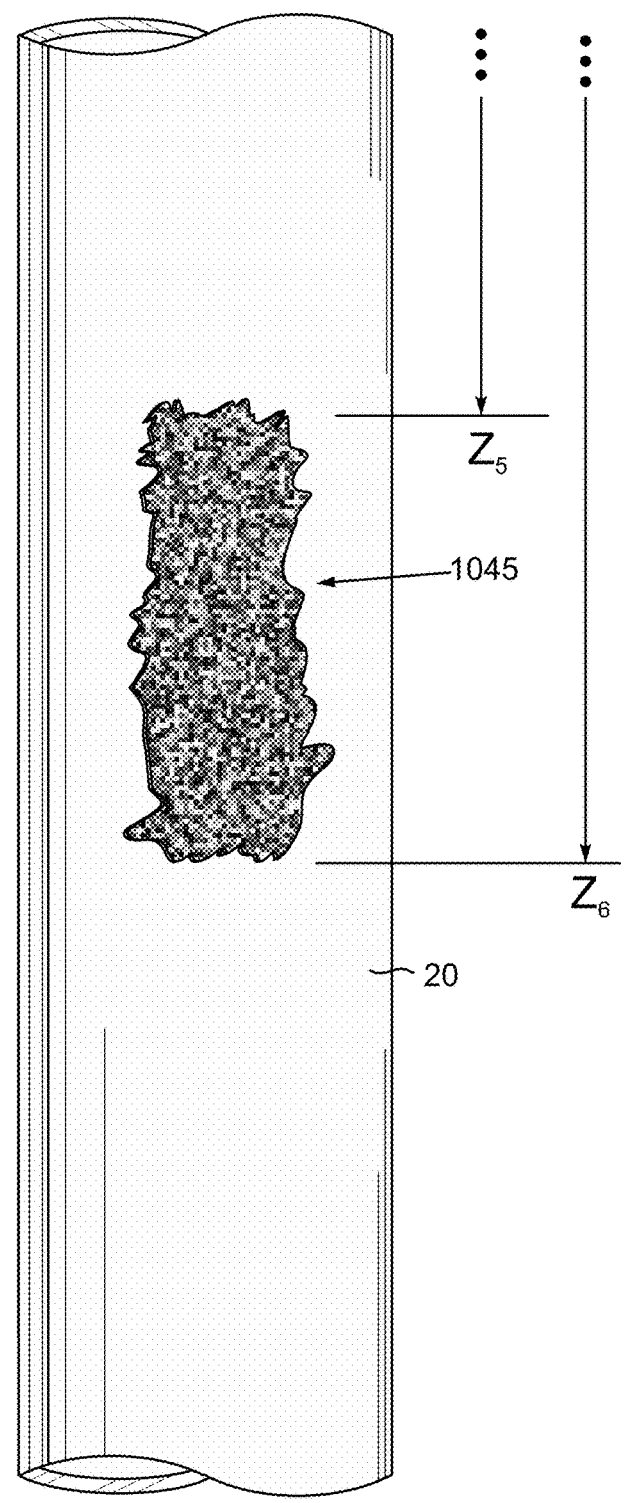
FIG. 10 is a side view of a portion of a well casing.

Exemplary phase shift measurement and thickness calculations will be described now in conjunction with FIGS. 9 and 10. FIG. 9 is a sectional view of the sensor housing 60 of the logging tool 10 and the casing 20 shown in FIG. 1 taken at section 9-9. Note that the location of section 9-9 is such that the receiver segments 150 and 160 depicted from the side in FIG. 1 are now shown in section as well as the receiver segments 280 and 290 and support mandrel 370 that were pictorially depicted in FIG. 2. Due to the location of section 9-9, the necked down portion 460 of the receiver segment 160 and the multi-turn coil main receiver 190 coil wound around the necked down portion 460 are visible. Similarly, the necked down portions 1015, 1020 and 1025 as well as the surrounding main receiver coils 1030, 1035 and 1040 are visible. A 360° coordinate system is superimposed on the casing 20. The instantaneous relative azimuth (or angular position or toolface) of the sensor housing 60 is some angle θ measured from a selected point, say the midpoint 1042 of the main receiver 190, relative to 0°. The selected point may be anywhere on the sensor housing 60. In this illustration the relative azimuth θ is between 90° and 180°. Assume for the purposes of this illustration that the casing 20 has a thinned portion 1045. The thinned portion 1045 may be the result of corrosion, mechanical damage or other factors. It may be useful to characterize the thinned portion 1045 by a vertical dimension as shown in FIG. 10, which may be the difference between the depths $Z_6$ and $Z_5$ or $Z_6-Z_5$. At each depth when a measurement is taken, the casing 20 has some average thickness $T_{190}$ in the vicinity of the receiver 190. Similarly, the casing 20 has some average thickness $T_{1030}$ in the vicinity of the receiver coil 1030, some average thickness $T_{1035}$ in the vicinity of the receiver coil 1035 and some average thickness $T_{1040}$ in the vicinity of the receiver coil 1040. The remote field eddy current electromagnetic field picked up by any of the receivers, such as the main receiver 190, will be proportional to the average thickness proximate the receiver in question such as the thickness $T_{190}$. The following description of the thickness determination in response to phase shift determination for the transmitter 190 will be illustrative of the other transmitters 1030, 1035 and 1040.

The phase shift $\Phi_{190}$ sensed by the main receiver coil 190 is proportional to the average casing thickness proximate the main receiver 190 according to:

$$\Phi_{190} = 2 \times \frac{T_{190}}{\delta} \tag{1}$$

where δ is the casing skin depth and the multiplying factor 2 is valid where $Z_6-Z_5 \geq Z_1$ where $Z_1$ is the spacing between the main receiver 190 and the transmitter 120 (see FIG. 1). The casing skin depth δ is given by:

$$\delta = \sqrt{\frac{2}{\sigma\mu\omega}} \tag{2}$$

where σ is the conductivity of the casing material, μ is the magnetic permeability of the casing material and ω is the angular frequency. The total relative phase shift $\Phi_{190}$ becomes:

$$\Phi_{190} = T_{190}\sqrt{2\sigma\mu\omega} = 2T_{190}\sqrt{\pi f\sigma\mu} \tag{3}$$

where f is the signal frequency. The average thickness $T_{190}$ is then given by:

$$T_{190} = \frac{\Phi_{190}}{2\sqrt{\pi f\sigma\mu}} \tag{4}$$

The permeability μ is given by:

$$\mu = \mu_0\mu_r \tag{5}$$

where $\mu_0 = 4\pi \times 10^{-7}$ N/A² and $\mu_r \approx 20 \sim 200$. Typically, the casing conductivity σ is in the range of $2.6 \sim 7.4 \times 10^6$ S/m. These calculations relate to measurements made by the main receiver 190, but extend to the other receivers. Indeed, there will be four (or more or less depending on the number of receivers and segments) phase shifts $\Phi_{190}$, $\Phi_{1030}$, $\Phi_{1035}$, and $\Phi_{1040}$ measured at the same time. The apparent casing wall thickness $T_{190}$, $T_{1030}$, $T_{1035}$ and $T_{1040}$ proximate each receiver 190, 1030, 1035 and 1040 will be determined from the phase shifts $\Phi_{190}$, $\Phi_{1030}$, $\Phi_{1035}$, and $\Phi_{1040}$, respectively, and may be plotted separately or as a 2D thickness map The average phase shift $\Phi_{avg}$ may be calculated by:

$$\Phi_{avg} = \frac{(\Phi_{190} + \Phi_{1030} + \Phi_{1035} + \Phi_{1040})}{4} \qquad (6)$$

and the average thickness $T_{avg}$ at the measurement depth is given by:

$$T_{avg} = \frac{\Phi_{avg}}{2\sqrt{\pi f \sigma \mu}} \qquad (7)$$

This average thickness $T_{avg}$ may be plotted on a log column. To enhance contrast, the azimuthal signal could also be plotted using $T_{190}'$, $T_{1030}'$, $T_{1035}'$ and $T_{1040}'$ where $T_{190}' = T_{190} - T_{avg}$, $T_{1030}' = T_{1030} - T_{avg}$ and so on for $T_{1035}'$ and $T_{1040}'$. Also a 2D dynamic thickness map may be plotted.

Note that the differential receivers (the receivers 180 and 200 and the others not numbered in FIGS. 1 and 2) will have the same circumferential positions as the receivers 190, 1030, 1035 and 1040 shown in FIG. 9, albeit at a different vertical position. Accordingly, a phase shift $\Phi_{200}$ sensed by the differential receiver 200 may be used to compute a differential phase shift $\Phi_{200diff}$ associated with the main receiver 190 and the differential receiver 200 pair according to:

$$\Delta\Phi_{200diff} = \Phi_{190} - \Phi_{200} \qquad (8)$$

The differential thickness for the main receiver 190 and differential receiver 200 pair is given by:

$$T_{200diff} = \frac{\Delta\Phi_{200diff}}{2\sqrt{\pi f \sigma \mu}} \qquad (9)$$

Equation (9) can be solved for the other main and differential receiver pairs to yield additional differential thicknesses $T_{180diff} \ldots T_{idiff}$ where "I" indicates the differential receiver number. Thus, the average differential thickness $T_{avgdiff}$ may be calculated according to:

$$T_{avgdiff} = \frac{1}{n}\sum_i T_{idiff} \qquad (10)$$

Also a 2D dynamic differential thickness map may be plotted. If the relative azimuth θ is measured and correlated with the thickness measurements, then not only will the physical characteristics of the thinned portion 1045 be determined, but also the azimuthal location of the thinned portion 1045. As note above, the true azimuth θ may be determined by way of a gyroscopic measurement of otherwise.

Figure 11:
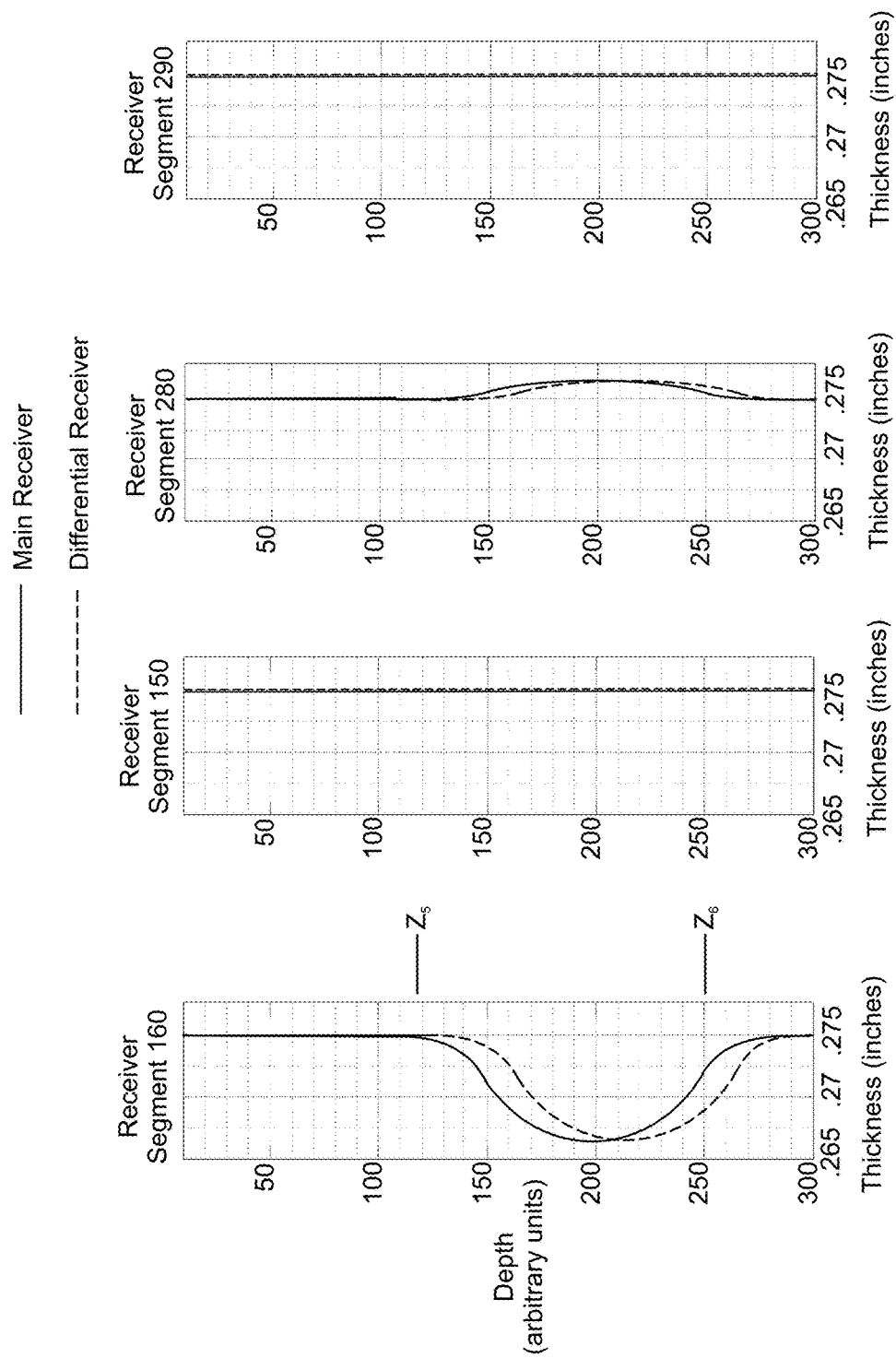
FIG. 11 depicts exemplary log plots of azimuthal casing thickness.

FIG. 11 depicts exemplary thickness log plots based on phase shift determination for the receiver segments 160, 150, 280 and 290 depicted in FIG. 9. Note that the plots depict not only the thickness log for a given receiver segment main receiver (e.g., the main receiver 190) as a solid line but also a plot of differential receiver (e.g. from differential receiver 200) thickness determination as a dashed line. Here, the logs assume an average thickness range of 0.265 to 0.275 inches. Since the receiver segment 160, and in particular the main receiver 190 and its corresponding differential receiver 200 (see FIG. 2) are positioned facing towards the thinned portion 1045 of the casing 20, the plot for receiver segment 160 shows a pronounced drop in casing thickness and also shows the vertical extent of the thinned portion 145 as reflected by the distance between $Z_5$ and $Z_6$ in depth. This is not surprising since the phase shift of the signal as it propagates through the thinned portion 1045 will be proportionally less than in the unthinned portions of the casing 20. However, the plot for the receiver segment 280, which is diametrically opposed to the thinned portion 1045 shows a smaller, but opposite change, i.e., an increase in the thickness. The receiver segments 150 and 290 sense virtually no deviations in thickness and this is reflected in the flat plots. Of course it may be possible to simply average the thickness values (see Equation (7) above) of the receiver segments 150, 160, 280 and 290 and come up with an average casing thickness as a function of depth and plot that on a similar plot as well. Furthermore, the thickness values obtained from the measurements of the receiver segments 150, 160, 280 and 290 can be used for casing collar location. When a casing collar is sensed, the four plots shown in FIG. 11 would all show a pronounced increase in thickness for the same depth range. However, if combined with azimuth θ data as discussed above, then the thickness logs may be used to create thickness images. It should be understood that a simulation has been performed using a 5.5 inch casing with a nominal 0.275 inch thickness and an artificially created longitudinally extending slot. The slot was milled through the full thickness of the casing to simulate a thinned portion of a down hole casing. A slot with ½ inch width and an 8.0 inch length (see $Z_6 - Z_5$ in FIG. 10) was milled and phase shift measurements taken. The azimuthal sensitivity of the downhole logging tool 10 as reflected in the exemplary plots in FIG. 11 was demonstrated during these simulations.

Figure 12:
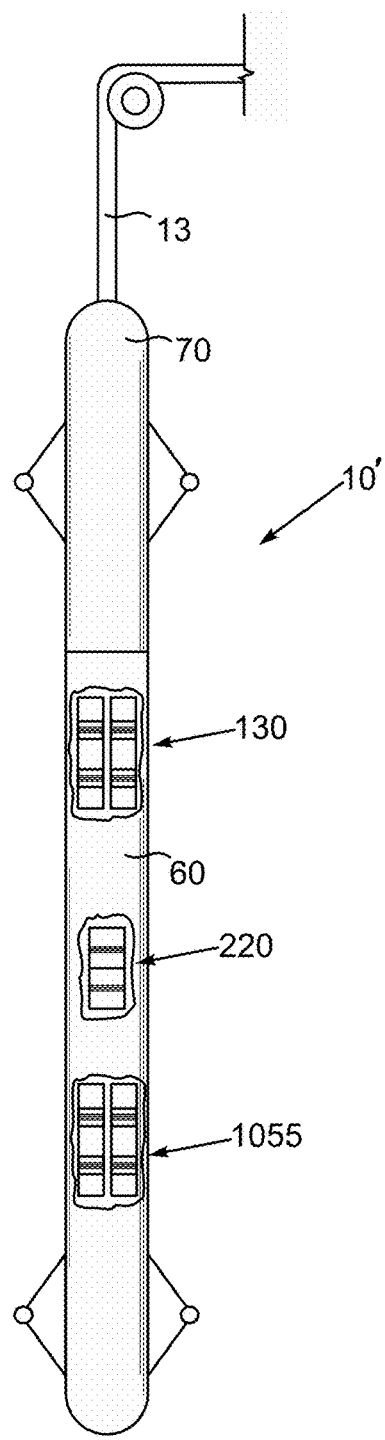
FIG. 12 is a side view of an alternate exemplary downhole logging tool.

The interaction between the transmitters and receivers in the remote field eddy current frequency spectrum is reciprocal in that not only can segmented receivers provide an azimuthal indication of casing thickness in response to a single transmitter but the opposite is true in that segmented transmitters could be used with a single or with segmented receivers. In this regard, attention is now turned to FIG. 12, which is a side view of an alternate exemplary downhole logging tool 10'. FIG. 12 is simplified in that the formation and casing are not depicted. The downhole logging tool 10' may be substantially similar to the downhole logging tool 10 embodiment described and depicted above and thus may include a sensor housing 60 and an electronics housing 70 and be supported by way of a cable 13. The sensor housing 60 may enclose a receiver array 130 and a caliper assembly 220 of the type described and shown above. In addition, a transmitter array 1055 may be positioned in the sensor housing 60 and configured like the receiver array 130 albeit with the opposite functionality, that is, to function as a plurality of segmented and circumferentially spaced main transmitter and differential transmitter coils. Indeed it may be possible to configure the receiver coils of the receiver array 130 and the transmitters of the transmitter array 1055 as transceiver coils, that is capable of either transmission or reception or both. Indeed the same is true with regard to the other disclosed embodiments such as the downhole logging tool 10 wherein the transmitter 120 could function as a transmitter or a receiver and vice versa with regard to the receivers of the receiver array 130.

The embodiment of the downhole logging tool 10 depicted in FIGS. 1 and 2 and described above includes a segment receiver array 130 and the alternate embodiment downhole logging tool 10' depicted in FIG. 12 and just described includes a segmented receiver array 130 and a segment transmitter array 1055. However, the skilled artisan will appreciate that multiple combinations of transmitter configuration, receiver configuration, transmitter/receiver position and differential measurement or not may be used. The following table lists some possible combinations.

TABLE

| Option # | Transmitter Configuration | Receiver Configuration | Differential Receiver | Transmitter Position |
|---|---|---|---|---|
| 1 | Unsegmented | Segmented | Segmented | Up |
| 2 | Unsegmented | Segmented | Segmented | Down |
| 3 | Segmented | Unsegmented | Unsegmented | Up |
| 4 | Segmented | Unsegmented | Unsegmented | Down |
| 5 | Unsegmented | Segmented | None | Up |
| 6 | Unsegmented | Segmented | None | Down |
| 7 | Segmented | Segmented | Segmented | Up |
| 8 | Segmented | Segmented | Segmented | Down |
| 9 | Segmented | Segmented | None | Up |
| 10 | Segmented | Segmented | None | Down |

Here, the term "unsegmented" refers to a transmitter or receiver array that includes a single transmitter or receiver in one circumference around the tool axis, "segmented" refers to a transmitter or receiver array that includes multiple transmitters or receivers positioned in a segmented fashion, i.e., as in FIGS. 1 and 2, "differential sensor" refers to the inclusion of a segmented or unsegmented differential receiver, "none" refers to the exclusion of a differential receiver, and "Up" or "Down" refers to the position of the transmitter array relative to the receiver array. For example, Option #1 includes an unsegmented transmitter array combined with a segmented receiver array and a segmented differential receiver array and where the transmitter array is positioned Up, that is, above the receiver array. Option #2 is like Option #1, but the vertical positions of the transmitter array the receiver array swapped. Option #3 includes a segmented transmitter array, a single or unsegmented receiver array and a single or unsegmented differential receiver with the transmitter in the up position, and so on for the other options. Note that there are other potential combinations, for example, where differential transmitters are included.

Figure 13:
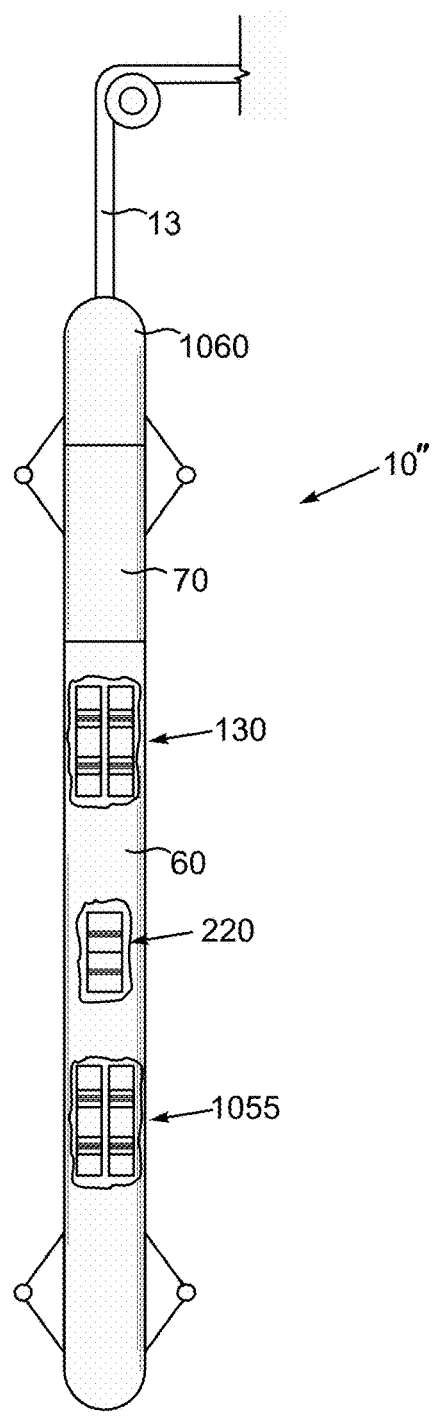
FIG. 13 is a side view of another alternate exemplary downhole logging tool.

As noted briefly above, any of the disclosed embodiments of the downhole logging tool may be operated on a wire line or slick line basis. For example, FIG. 13 depicts a side view of a downhole logging tool 10", which is suspended from a cable 13 that is a slick line as opposed to a wire line. In this context, a power and data storage sonde 1060 may be connected to the electronics housing 70 or elsewhere to provide downhole power via batteries and data storage. In other respects, the casing inspection tool 10" may be substantially similar to the other disclosed embodiments and thus include a sensor housing 60, the receiver array 130, the transmitter array 1055 (or a single transmitter 120 as in FIG. 1) as well as the caliper array 220 or the other disclosed types of transmitters and receivers.

Figure 14:
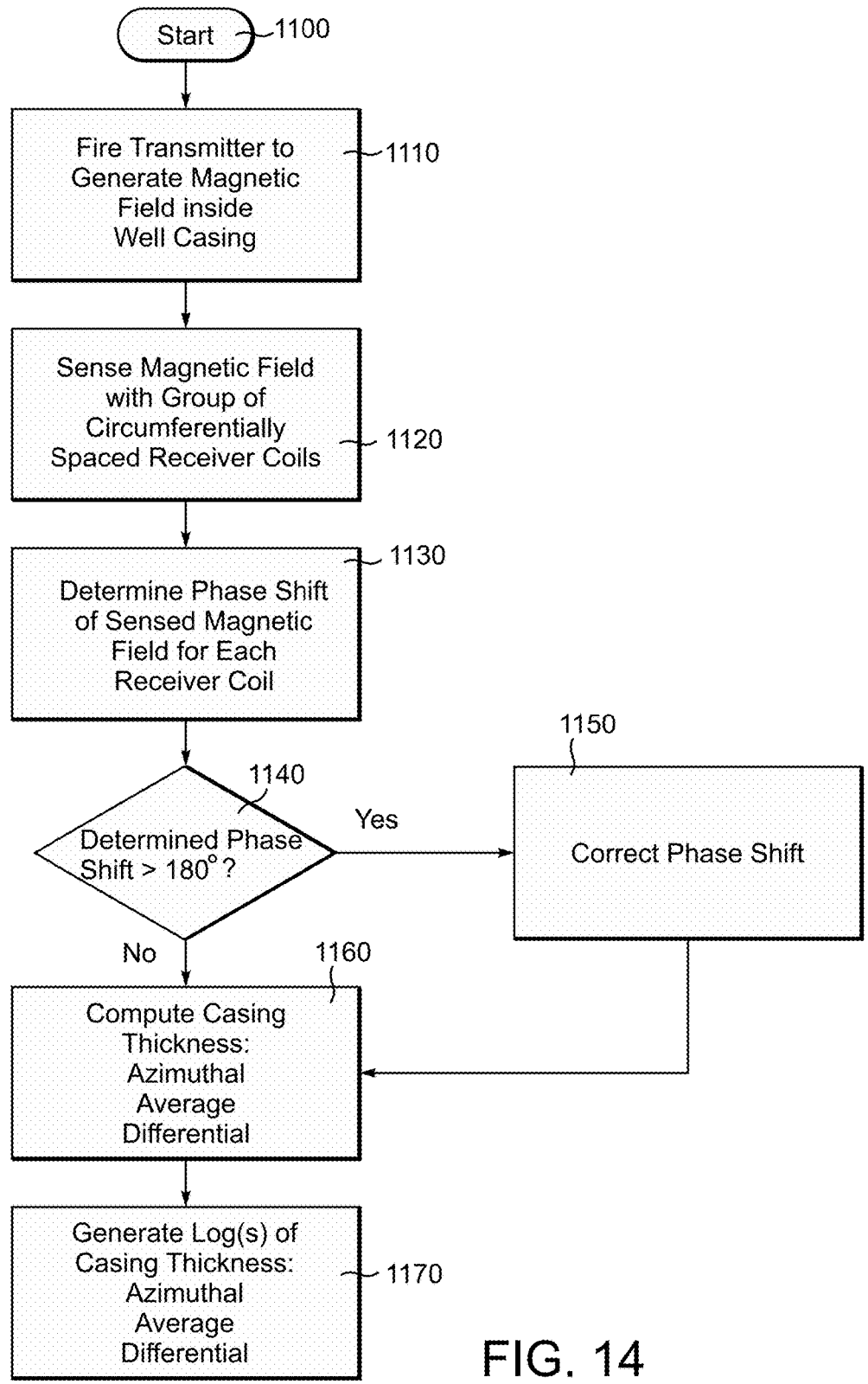
FIG. 14 is a flow chart depicting an exemplary method of logging using disclosed tool embodiments.

Some exemplary logging techniques will now be described in conjunction with FIGS. 14-16. FIG. 14 is a block diagram that depicts an exemplary method of logging utilizing for example any of the disclosed embodiments with a single transmitter and multiple circumferentially spaced receivers such as shown in FIGS. 1 and 2, for example. Following the start at step 1100, at step 1110 the transmitter is fired to generate a magnetic field inside the well casing 20 (see FIGS. 1 and 9) and as disclosed elsewhere herein the objective is to make a measurement at the remote field. At step 1120, the generated magnetic field is sensed with a group of circumferentially spaced receivers using, for example, the arrangement disclosed in FIG. 9. This step also involves the sensing of the magnetic field with the differential receivers that are depicted in FIGS. 1 and 2, for example. At step 1130, the phase shift is determined for the sensed magnetic field for each of the receivers. At step 1140, a determination is made as to whether the determined phase shifts are greater than 180° or would otherwise produce an ambiguous result for casing thickness. If yes, then at step 1150 the phase shift is corrected and then the process moves to step 1160 where the casing thickness is computed. This may be an azimuthal casing thickness associated with that portion of the casing facing each of the individual circumferentially spaced receivers, an average of these azimuthal thicknesses and of course a differential casing thickness. If, on the other hand, at step 1140 the determined phase is not beyond 180° then the process proceeds directly to step 1160 as just described. Finally, at step 1170, logs may be generated of the casing thickness and this may again be logs of the azimuthal thickness the average thickness and the differential thickness as desired. At this point, the process may return to step 1110.

Figure 15:
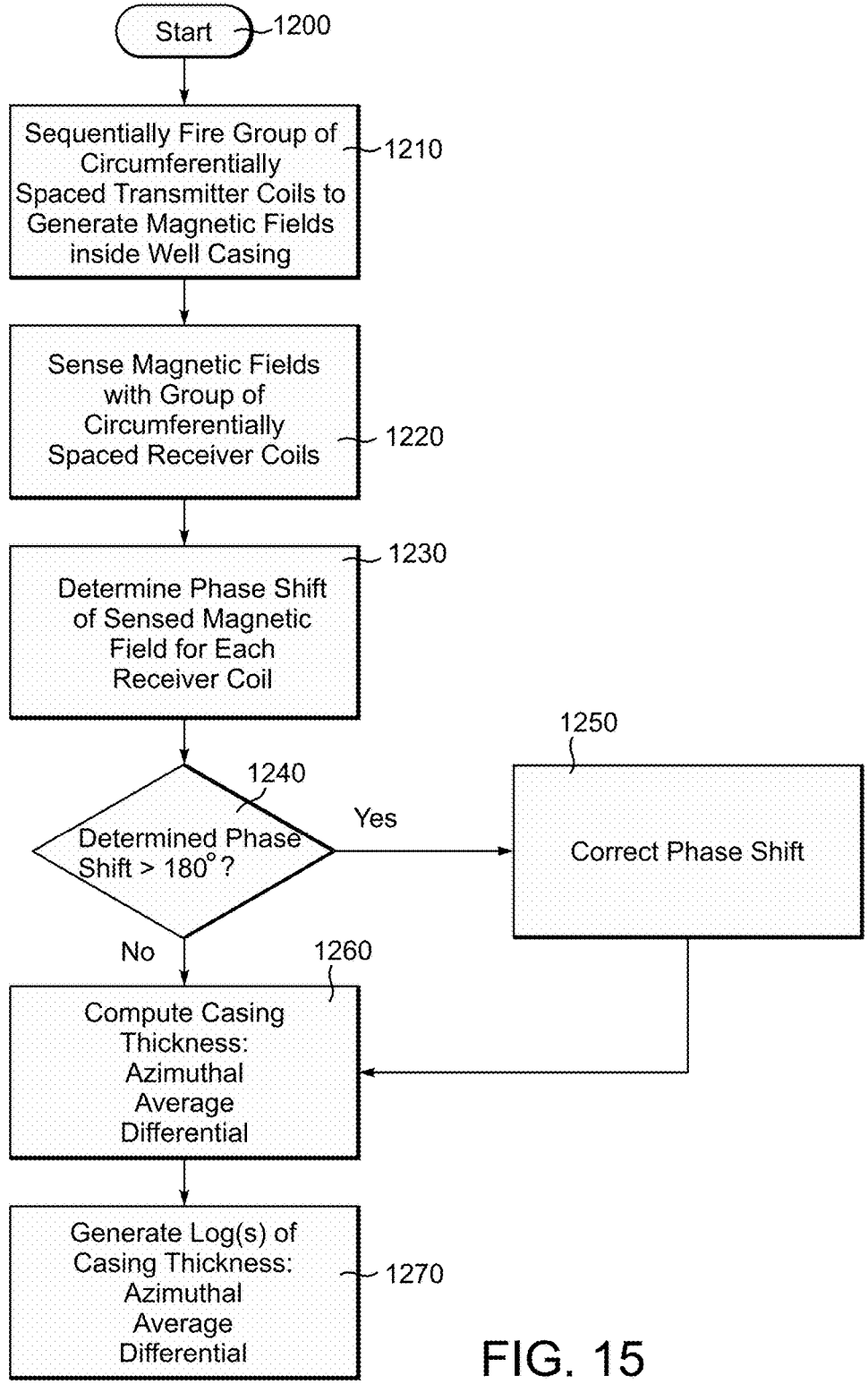
FIG. 15 is a flow chart depicting an alternate exemplary method of logging using disclosed tool embodiments.

An alternate exemplary logging method is shown in the flow chart of FIG. 15 where a tool embodiment that utilizes both circumferentially spaced transmitters and circumferentially spaced receivers may be used, such as the tool embodiment depicted in FIG. 12. Here, after a start at step 1200, the group of circumferentially spaced transmitters may be fired sequentially to generate magnetic fields inside the well casing. Next, at step 1220, the generated magnetic fields may be sensed with a group of circumferentially spaced receivers. Next at step 1230 the phase shifts of the sensed magnetic fields for each receiver may be determined. Next at step 1240, a determination is made as to whether or not any of the sensed or determined phase shifts is greater than 180° or otherwise ambiguous and at step 1250 the phase shift or shifts is corrected and then the method proceeds to step 1260 where the casing thickness may be computed that is azimuthal average and differential as disclosed above. Finally at step 1270, logs of casing thickness for azimuthal average and/or differential may be computed and then this process may return to step 1210.

Figure 16:
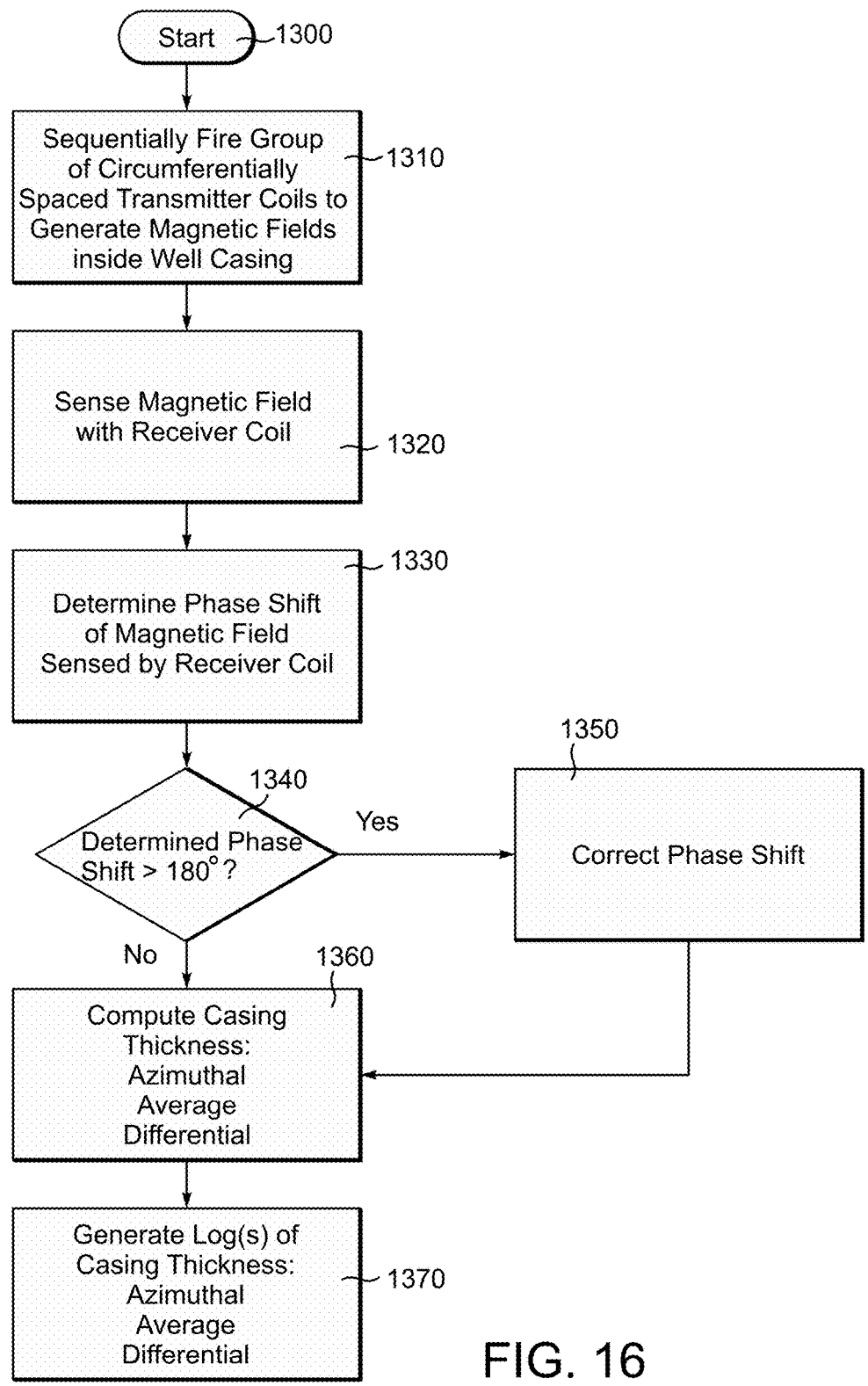
FIG. 16 is a flow chart depicting another exemplary method of logging using disclosed tool embodiments.

Still another exemplary logging method is depicted in the flow chart of FIG. 16 where a tool embodiment that utilizes a group of circumferentially spaced (i.e., segmented) transmitters with a single receiver (i.e., unsegmented) coil may be used. As noted above, because of the reciprocal nature of the remote eddy field current measurement, the receivers in the receiver array of 130 and the transmitter 120 may be flip flopped in operation and still yield an azimuthal casing thickness measurement. Thus, after a start at step 1300, at step 1310 the group of circumferentially spaced transmitters may be sequentially fired and at step 1320 the sequentially generated magnetic fields may be sensed by the receiver. Next at step 1330, the phase shift of the magnetic field may be sensed by the receiver. At step 1340, a determination is made as to whether the determined phase shift is greater than 180° and if so at step 1350 the phase shift is corrected and thereafter at step 1360 the casing thickness, azimuthal average or differential as just described above may be determined. If, however, at step 1340 the determined phase shift is not greater than 180° or otherwise ambiguous then the process may proceed directly to step 1360. Finally at step 1370, casing thickness logs for azimuthal average and/or differential may be computed and ultimately the process returned to step 1310.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A downhole logging tool for inspecting a well casing, comprising:
    a housing adapted to be supported in the well casing by a support cable;
    a transmitter positioned in the housing and being operable to generate a magnetic field;
    plural receivers positioned in the housing in circumferentially-spaced apart relation and being operable to sense the magnetic field with azimuthal sensitivity;
    a receiver sleeve positioned in the housing and including a hub and plural circumferentially-spaced fins extending away from the hub; and
    plural electrically insulating receiver segments positioned on the hub, each of the receiver segments being positioned between adjacent fins of the plural circumferentially-spaced fins, each of the receivers being mounted on one of the receiver segments.

2. The downhole logging tool of claim 1, comprising electronic circuitry operatively coupled to the receivers to determine a parameter of the sensed magnetic field and determine a characteristic of the well casing based on the parameter.

3. The downhole logging tool of claim 1, wherein the receiver sleeve comprises an electrically conductive material.

4. The downhole logging tool of claim 1, wherein the receiver sleeve comprises an electrically insulating material.

5. The downhole logging tool of claim 1, wherein each of the receivers comprises a wire coil.

6. The downhole logging tool of claim 1, wherein each of the receivers comprises a flux gate magnetometer, a Hall Effect sensor or a giant magneto resistive sensor.

7. The downhole logging tool of claim 2, wherein the electronic circuitry is positioned in the housing.

8. The downhole logging tool of claim 2, wherein the electronic circuitry is not positioned in the housing.

9. The downhole logging tool of claim 2, wherein the parameter comprises a phase shift of the sensed magnetic field relative to the generated magnetic field and the characteristic comprises a thickness of the well casing.

10. The downhole logging tool of claim 9, wherein the electronic circuitry is operable to determine an amplitude attenuation of the sensed magnetic field relative to the generated magnetic field and determine the characteristic of the well casing based on the parameter and the amplitude attenuation.

11. The downhole logging tool of claim 1, comprising plural transmitter coils positioned in the housing in circumferentially-spaced apart relation and being operable to generate plural magnetic fields, the plural receivers being operable to sense the plural magnetic fields with azimuthal sensitivity.

12. The downhole logging tool of claim 11, comprising electronic circuitry operatively coupled to the receivers to determine a parameter of the sensed magnetic fields and determine a characteristic of the well casing based on the parameter wherein the parameter comprises a phase shift of the sensed magnetic fields relative to the generated magnetic field and the characteristic comprises a thickness of the well casing.

13. A downhole logging tool for inspecting a well casing, comprising:
    a housing adapted to be supported in the well casing by a support cable;
    plural transmitters positioned in the housing in circumferentially-spaced apart relation and being operable to generate plural magnetic fields;
    a receiver positioned in the housing and being operable to sense the magnetic fields with azimuthal sensitivity; and
    a transmitter sleeve positioned in the housing and including a hub and plural circumferentially-spaced fins extending away from the hub, and an electrically insulating transmitter segment positioned between adjacent fins, each of the transmitters being mounted on one of the transmitter segments.

14. The downhole logging tool of claim 13, comprising electronic circuitry operatively coupled to the receiver to determine a parameter of the sensed magnetic field and determine a characteristic of the well casing based on the parameter.

15. The downhole logging tool of claim 13, wherein the transmitter sleeve is composed of an electrically conductive material.

16. The downhole logging tool of claim 14, wherein the electronic circuitry is positioned in the housing.

17. The downhole logging tool of claim 14, wherein the electronic circuitry is not positioned in the housing.

18. The downhole logging tool of claim 13, wherein each of the transmitters comprises a wire coil.

19. The downhole logging tool of claim 13, wherein the receiver comprises a flux gate magnetometer, a Hall Effect sensor or a giant magneto resistive sensor.

20. The downhole logging tool of claim 13, wherein the receiver comprises a wire coil.

21. The downhole logging tool of claim 14, wherein the parameter comprises a phase shift of the sensed magnetic field relative to the generated magnetic field and the characteristic comprises a thickness of the well casing.

22. The downhole logging tool of claim 14, wherein the electronic circuitry is operable to determine an amplitude attenuation of the sensed magnetic field relative to the generated magnetic field and determine the characteristic of the well casing based on the parameter and the amplitude attenuation.

23. A method of downhole logging a well having a well casing, comprising:
    suspending a housing in the well casing by a support cable;

energizing a transmitter positioned in the housing to generate a magnetic field;

sensing the magnetic field with plural receivers positioned in the housing in circumferentially-spaced apart relation, the plural receivers sensing the magnetic field with azimuthal sensitivity, the plural receivers being on a receiver sleeve positioned in the housing, the receiver sleeve and including a hub and plural circumferentially-spaced fins extending away from the hub, each of the receivers being mounted an electrically insulating receiver segment positioned between adjacent fins of the plural circumferentially-spaced fins; and determining a parameter of the sensed magnetic field and a characteristic of the well casing based on the parameter.

24. The method of claim 23, wherein the receiver sleeve is composed of an electrically conductive material.

25. The method of claim 23, comprising determining the parameter and characteristic using electronics positioned in the housing.

26. The method of claim 23, comprising determining the parameter and characteristic using electronics not positioned in the housing.

27. The method of claim 23, wherein the parameter comprises a phase shift of the sensed magnetic field relative to the generated magnetic field and the characteristic comprises a thickness of the well casing.

28. The method of claim 23, comprising determining an amplitude attenuation of the sensed magnetic field relative to the generated magnetic field and determining the characteristic of the well casing based on the parameter and the amplitude attenuation.

29. The method of claim 23, wherein each of the receivers comprises a wire coil.

30. The method of claim 23, wherein each of the receivers comprises a flux gate magnetometer, a Hall Effect sensor or a giant magneto resistive sensor.

31. The method of claim 23, comprising energizing plural transmitters positioned in the housing in circumferentially-spaced apart relation to generate plural magnetic fields, sensing the plural magnetic fields with the receiver and determining a parameter of the sensed magnetic fields and a characteristic of the well casing based on the parameters.

32. The method of claim 31, wherein the parameter comprises a phase shift of the sensed magnetic fields relative to the generated magnetic fields and the characteristic comprises a thickness of the well casing.

33. A method of downhole logging a well having a well casing, comprising:

suspending a housing in the well casing by a support cable;

energizing plural transmitter coils positioned in the housing in circumferentially-spaced apart relation to generate plural magnetic fields, the transmitter coils being positioned on a transmitter sleeve positioned in the housing, the transmitter sleeve including a hub and plural circumferentially-spaced fins extending away from the hub, and an electrically insulating transmitter segment positioned between adjacent fins of the circumferentially-spaced fins, each of the transmitters being mounted on one of the transmitter segments;

sensing the magnetic fields with a receiver positioned in the housing; and determining a parameter of the sensed magnetic fields and a characteristic of the well casing based on the parameter.

34. The method of claim 33, wherein the parameter comprises a phase shift of the sensed magnetic fields relative to the generated magnetic fields and the characteristic comprises a thickness of the well casing.

35. The method of claim 33, comprising determining an amplitude attenuation of the sensed magnetic fields relative to the generated magnetic fields and determining the characteristic of the well casing based on the parameter and the amplitude attenuation.

\* \* \* \* \*